United States Patent [19]

Caldwell et al.

[11] Patent Number: 4,984,449

[45] Date of Patent: Jan. 15, 1991

[54] ULTRASONIC LIQUID LEVEL MONITORING SYSTEM

[75] Inventors: Joseph W. Caldwell, Danville; Mark W. Slobodnik, Martinez, both of Calif.

[73] Assignee: Caldwell System Corp., Livermore, Calif.

[21] Appl. No.: 376,666

[22] Filed: Jul. 3, 1989

[51] Int. Cl.⁵ .................... G01M 3/24; G01N 23/28
[52] U.S. Cl. ................................ 73/49.2; 73/290 V
[58] Field of Search .................. 73/492, 290 V, 592, 73/1 DV; 367/908

[56] References Cited

U.S. PATENT DOCUMENTS

| | | | |
|---|---|---|---|
| 4,063,457 | 12/1977 | Zekulin et al. | 73/290 V |
| 4,090,407 | 5/1978 | Shuler et al. | 73/290 V |
| 4,130,018 | 12/1978 | Adams et al. | 73/290 V |
| 4,158,964 | 6/1979 | McCrea et al. | 73/290 V |
| 4,170,765 | 10/1979 | Austin et al. | 73/290 V |
| 4,229,798 | 10/1980 | Rosie et al. | 364/564 |
| 4,337,656 | 7/1982 | Rapp | 73/290 V |
| 4,531,406 | 7/1985 | Fritz | 73/290 V |
| 4,748,846 | 6/1988 | Haynes | 73/290 V |
| 4,811,601 | 3/1989 | Tolan | 73/290 VX |

FOREIGN PATENT DOCUMENTS

| | | | |
|---|---|---|---|
| 0165852 | 12/1985 | European Pat. Off. | 73/290 V |
| 149640 | 11/1961 | U.S.S.R. | 73/290 V |

*Primary Examiner*—Hezron E. Williams
*Assistant Examiner*—Joseph W. Roskos
*Attorney, Agent, or Firm*—Klein & Szekeres

[57] ABSTRACT

A liquid level measuring system having a tubular ultrasonic probe with a length in excess of the depth of liquid to be measured; for vertical insertion into a tank. A transducer inside the tube, at a first distance above the bottom end of probe body, responds transmits a sinusoidal acoustical pulse through the probe to the surface of the liquid. An echo returns from the surface of the liquid to the transducer and provides a sinusoidal echo signal. A receiver responds to the echo signal by providing a start signal corresponding to the transmitter signal crossing a predetermined amplitude in a predetermined direction and by providing a stop signal corresponding to a first selected echo signal crossing a second predetermined reference level in a predetermined direction. The speed of sound in the liquid is measured by measuring the echo time to a calibration rod in the tube at a known distance from the transducer. A timer measures the time between the start and stop signals and provides the time to a sequential controller. The depth of the liquid and the leak rate of the tank are calculated for display.

17 Claims, 11 Drawing Sheets

U.S. Patent    Jan. 15, 1991    Sheet 1 of 11    4,984,449
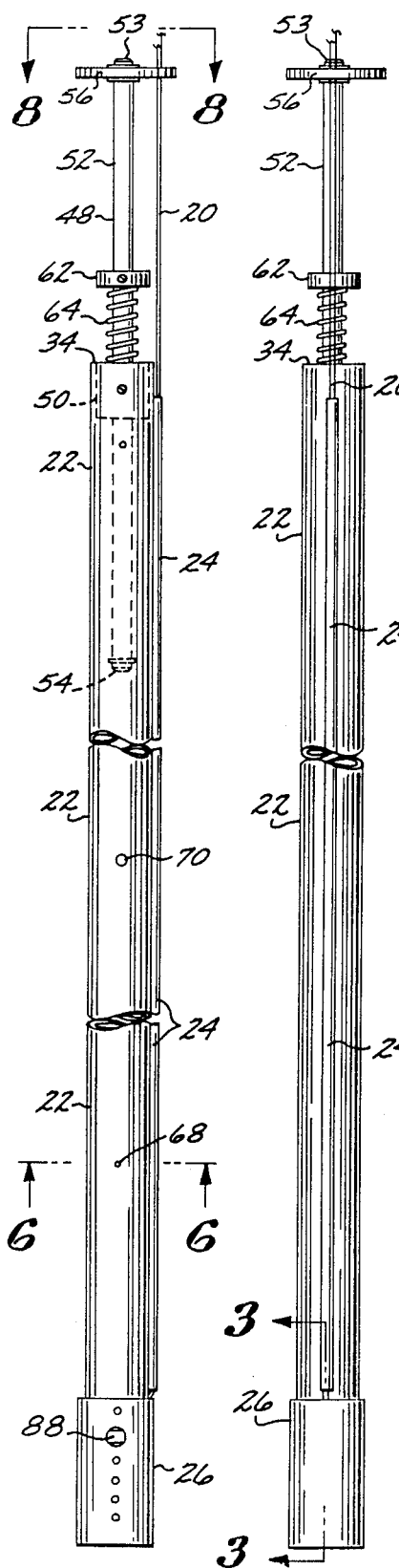
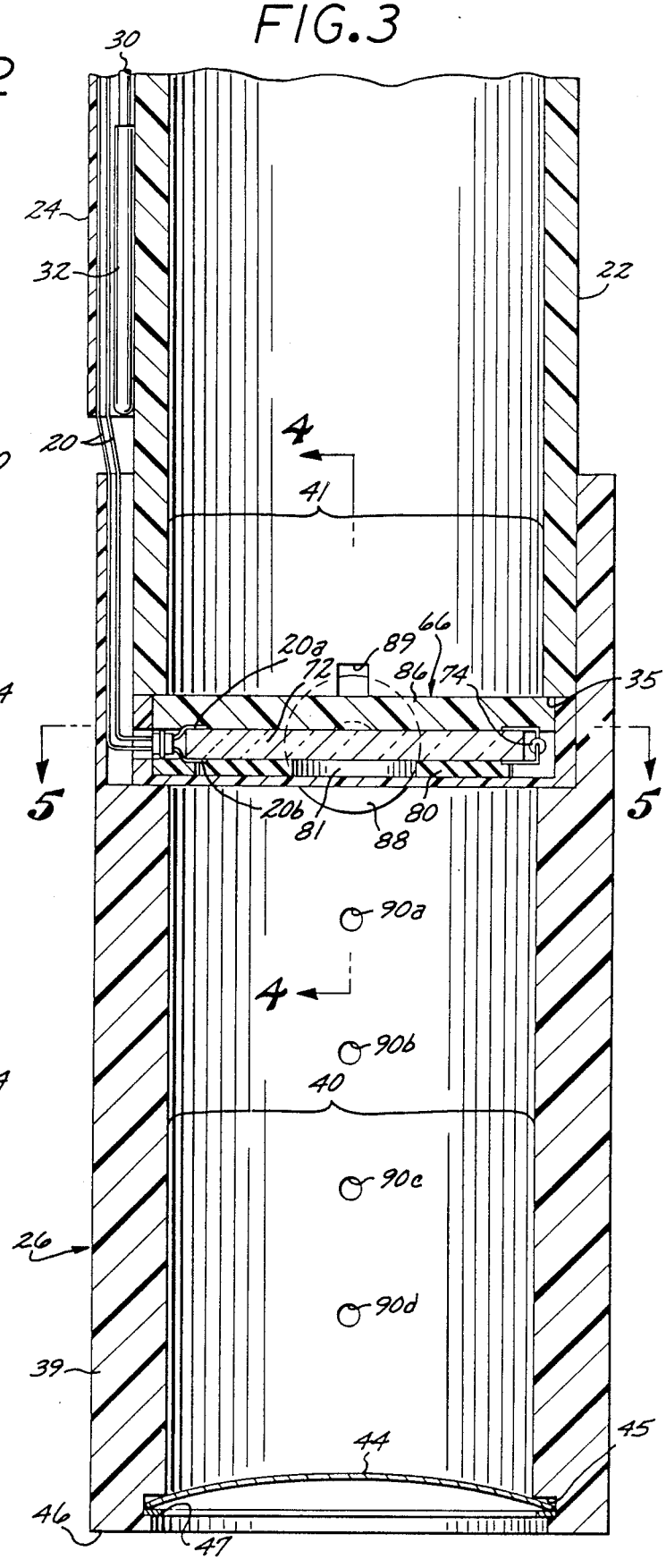

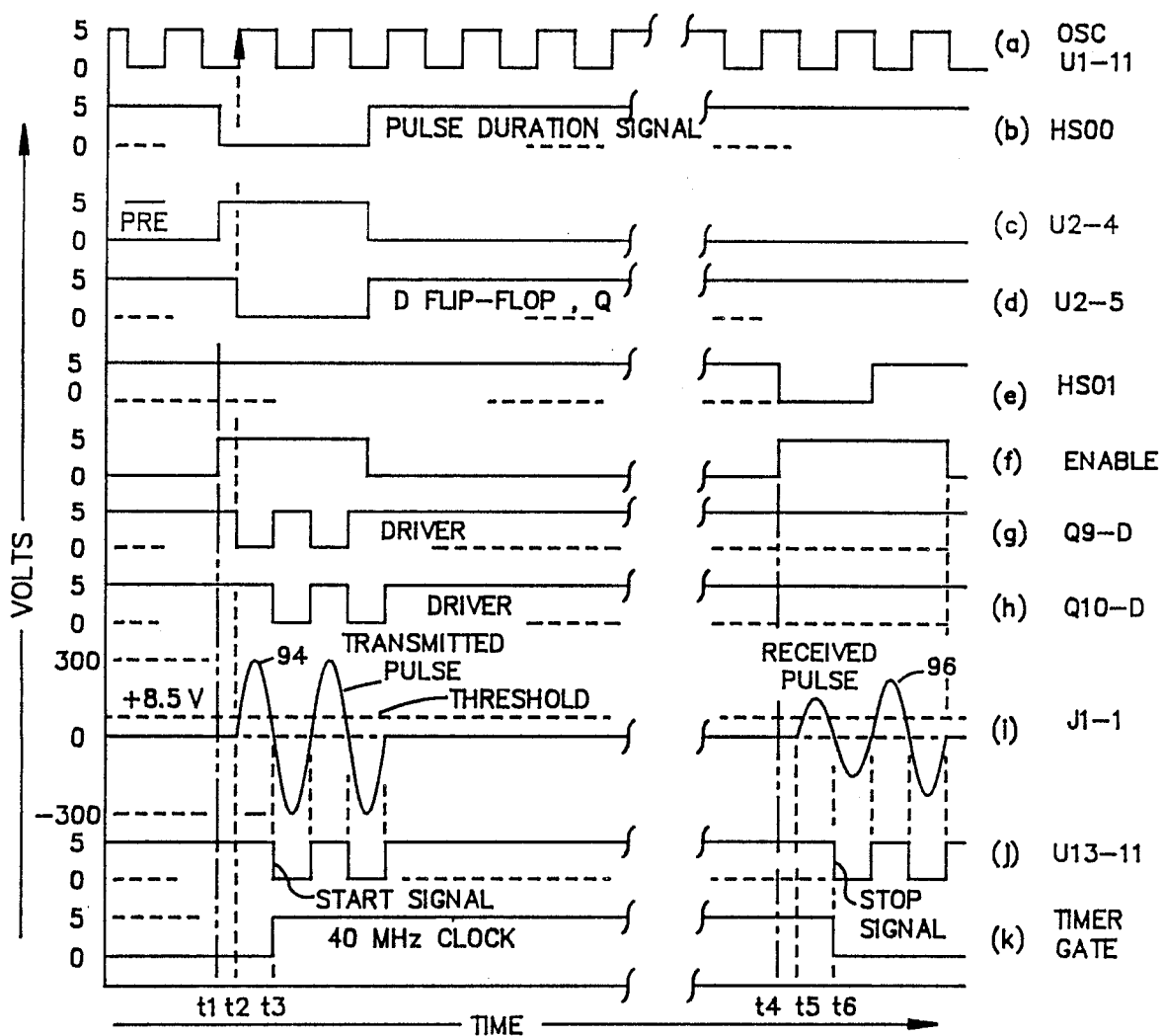
FIG. 12
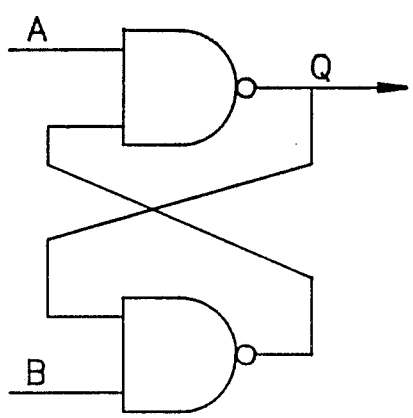
FIG. 14
| A | B | $Q_o$ | Q1 |
|---|---|---|---|
| 0 | 0 | X | 1 |
| 0 | 1 | X | 1 |
| 1 | 0 | X | 0 |
| 1 | 1 | X | $Q_o$ |
FIG 15

ULTRASONIC LIQUID LEVEL MONITORING SYSTEM

Reference is made to Appendix A submitted herewith and incorporated herein consisting of 3 sheets of microfiche consisting of 136 frames providing a program listing for the sequential controller.

1. Field of the Invention

This invention relates to the field of liquid level measuring systems that are used to measure, with a high degree of resolution, changes in the level of a liquid stored in a receptacle, such as a fuel tank. Specifically, the invention relates to a the field of probes and liquid level measuring systems that use ultrasonic pulses to measure the liquid level.

2. Description of the Prior Art

Environmental protection considerations have made necessary the monitoring of liquid levels in underground storage tanks for petrochemical fuels and the like. A typical underground storage tank for liquid fuel storage is a cylinder having a length of 21 feet and a diameter of 8 feet. Current Environmental Protection Agency (EPA) regulations require that the owners of such fuel storage tanks monitor for fuel leaks with fuel loss rates as low as 0.10 gallons per hour. Leak rates this small in conventional tanks translate into a change in depth as small as 0.001 inches per hour.

Prior art systems typically address the problem of detecting fuel loss rates as low as 0.10 gallons per hour by performing a test which involves taking a number of depth measurements over a test interval selected to be long enough to detect the specified leak rate. The liquid level in such tanks is typically measured by ultrasonic monitoring systems that measure the time for an ultrasonic pulse to travel from a point near the bottom of the tank to the surface of the liquid and back to the point of transmission, as an echo from the liquid surface.

The time measured is thus the round trip time for the sound pulse, in the liquid in the tank under test. The measured time is divided by two to obtain the one way travel time from the bottom of the tank to the liquid surface. The time thus obtained is multiplied by the speed of sound in the liquid to obtain the depth of the liquid in the tank.

Variations in temperature influence the calculated depth, since the speed of sound in liquids varies as a function of temperature. The speed of sound in the liquid in the tank will thus vary to some extent over the term of the test, which may be several hours. Temperature changes of as little as 0.05 degrees Fahrenheit per hour, without compensation, can reduce the accuracy or resolution of the measurements taken with a conventional system sufficiently to exceed the entire error budget allowed by the EPA.

In some systems, sound is guided in an aluminum or steel pipe demonstrating a lack of awareness of the need to thermally isolate the column of liquid in the pipe from the fuel in the tank surrounding the pipe. Prior art systems typically compensate for such temperature variations by using a number of temperature sensors at depths corresponding to equal volumes. Such systems require the use of signal wires from each sensor to a main control unit at a distance from the tank. Those signal wires are made unnecessary by the subject invention.

The EPA requires that the system measure the depth of water that usually accumulates at the bottom of the tank. Prior art systems have used conductivity sensors located at the bottom of a tank to measure the depth of the water present. The conductivity sensors are capable of distinguishing the presence of water from the presence of fuel. Fuel is not conductive, so that the water level at the bottom of the tank is measured by measuring the change in resistance or conductivity of the sensor. Such systems require the use of signal wires that pass from the sensor to a main control unit that is distant from the tank. Conductivity sensors are also subject to a degradation in performance from contamination.

SUMMARY OF THE INVENTION

A principal object of the present invention is to determine the depth of a liquid in a tank by measuring the "time of flight" of an ultrasonic wave or pulse as it travels from a transducer, located near the base of the tank, to the surface of the liquid in the tank, plus the time required for the pulse to return to the transducer.

Another object of the invention is to measure the leak rate of a tank by making a large number of precise measurements of the time of flight during a test interval in such a manner that thermal effects on the measurement are minimized or eliminated.

Another object of the invention is to increase the resolution of the time of flight measurements by using a unique process in which the start of each substantially sinusoidal drive signal to drive the ultrasonic transducer is synchronized to begin with identical sinusoidal drive voltage sequences on consecutive transmitted pulses to provide identically-started drive signals to the transducer.

Another object of the invention is to couple a sample of the drive signal to a receiver, whereby the receiver responds to the sampled drive signal by providing a start signal for a master timer that corresponds to the sampled drive signal crossing a predetermined voltage level in a predetermined direction.

The receiver also provides a stop signal for the master timer by selecting the same received signal swing within each successive return echo signal and by marking the same zero crossing time of that signal within each successive return echo signal. The master timer measures the time between each start signal and stop signal pair to obtain substantially identical time of flight intervals for a series of readings within a test. The system measures the time of flight for both the main pulse from the surface of the liquid and the time of flight for a calibration rod using the same precise technique. If the time of flight to the calibration rods remains within predetermined limits over the interval of the test, and if the leak rate is within predetermined limits, the test is regarded as a qualifying test sequence and the data are used to predict the measured leak rate of the tank.

The receiver uses a first threshold detector to provide a threshold signal that corresponds to the received signal having an amplitude in excess of a first reference level. A flip-flop responds to the threshold signal and provides a threshold enable signal to a second threshold detector to enable the second threshold detector to respond to the received signal crossing a second predetermined reference level in a predetermined direction.

The ultrasonic probe for use with the liquid level measuring system provides one or more reference echo signals, from calibration rods or reflectors in the probe at known distances from the ultrasonic transducer assembly, along with the echo from the surface of the liquid. Echoes from the calibration rods make it possible to measure the speed of sound in the liquid over the test interval, which may last for several hours. Tank leak rates are calculated by making a large number of qualifying tests over a suitably long test interval. For the tests to be qualifying tests, liquid temperature in the probe must remain stable and within predetermined limits over the test interval and the fluid level in the probe must remain free of fluctuations such as those that result from nearby vibrations.

The calibration rods are positioned at precise known distances from the transducer within the probe and provide calibration return signals with each test sequence that are used to measure the speed of sound in the liquid for that sequence. A change in temperature of the liquid within the probe will produce a change in the measured speed of sound in the liquid. Changes in the liquid level or changes in the measured speed of sound in the liquid which exceed predetermined limits are indications of changing conditions in the tank and will result in the disqualification of leak rate tests, thereby insuring that leak rate data is taken only during periods of stable conditions in the tank.

The probe is made of material having a low thermal conductivity to thermally insulate the column of liquid in the probe from the liquid in the tank that surrounds the probe. The probe is ported to admit liquid only at its base, to reduce the flow of liquid into or out of the probe as the liquid in the tank moves around the outer walls of the probe.

The probe is typically a hollow cylinder or tube, made of thick wall fiber glass, which has poor thermal conductivity. Since the probe protects the column of liquid within its interior from turbulence present elsewhere in the tank, and since the movement of heat between the liquid outside the probe and the liquid inside the probe is limited by the high thermal resistance of the tube's material, the change in temperature of the column of liquid inside the probe is minimized. The height of the column of liquid in the probe will remain substantially fixed, regardless of temperature—and turbulence—related fluctuations in the depth of the liquid outside of the probe. The depth of the liquid inside the probe will thus change only when the volume of liquid in the tank changes, such as when a leak occurs, or when liquid is otherwise removed or added.

The probe is adapted for insertion into a tank for the measurement of the depth of liquid stored in the tank. The probe comprises a tubular probe body, preferably of circular cross section, having an upper end and a lower end and a central longitudinal axis. The length of the probe body is greater than the maximum depth of liquid to be measured.

A means for holding the probe body in a fixed reference position within the tank is provided and comprises a spring-loaded rod carrying a locking disk that is removably engageable with the interior of a standpipe at the top of the tank. The upper end of the probe body is thus fixed in place to hold the lower end of the probe against the bottom of the tank as the probe body extends downwardly through the liquid in the tank.

An ultrasonic transducer is mounted in the probe body at a first distance above its lower end for transmitting bi-directional pulses along the longitudinal axis of the probe, both to the surface of the liquid and to the lower end of the probe on the bottom of the tank. The transducer receives echoes from a back-ranging target at the lower end of the probe body, from the surface of the liquid and from the calibration rods.

The transducer is positioned on top of a damping washer. The damping washer is typically formed from sulfide rubber. The damping washer has a hole in it that permits a smaller amount of ultrasonic energy to exit the lower side of the transducer than the amount of energy that leaves the top of the transducer to move toward the surface of the liquid. The reduced energy level of the downwardly directed pulses is necessary because the distance from the transducer to the bottom of the tank is very short, and, without attenuation, the return signals from the bottom of the tank would be too large to permit the measurements that must be made.

BRIEF DESCRIPTION OF THE DRAWINGS

FIG. 1 is a front elevational view of an ultrasonic probe used in the present invention;

FIG. 2 is a side elevational view of the probe;

FIG. 3 is a partial sectional view, taken on line 3—3 of FIG. 2, showing the transducer assembly in section;

FIG. 12 is a timing diagram showing the signal levels for starting and stopping the 40 MHz timer used in the invention;

FIG. 14 is a schematic diagram of a latch flip-flop used in the invention;

FIG. 15 is a truth table for the latch flip-flop of FIG. 14 showing the final output at Q1 of the flip-flop;

DETAILED DESCRIPTION OF A PREFERRED EMBODIMENT OF THE INVENTION

Figure 7:
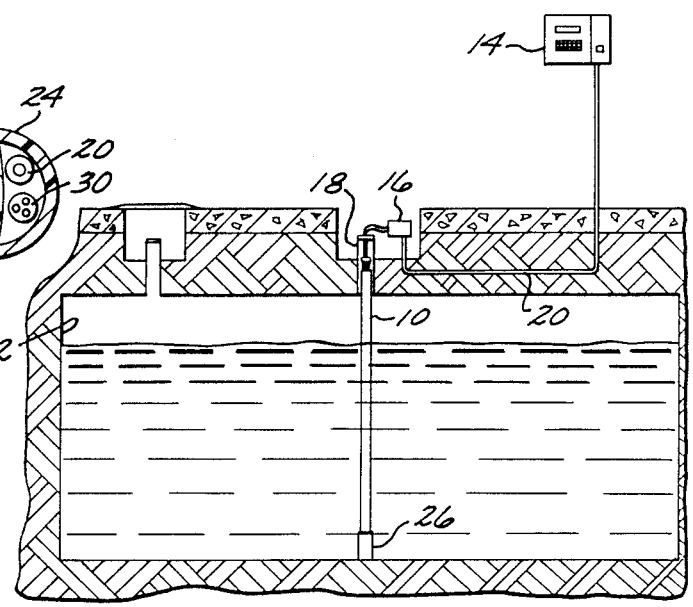
FIG. 7 is a semi-schematic sectional view of an underground storage tank, showing the ultrasonic probe installed therein and connected to an ultrasonic fluid level measuring system.

FIG. 7 shows a liquid level monitoring system in accordance with the present invention, including a probe 10 installed so as to monitor the level of liquid in an underground tank 12. The tank 12 is of the type used to store a liquid, such as a petrochemical fuel. The probe 10 operates to monitor the depth of the liquid in the tank and to detect leaks in the tank in excess of a predetermined limit.

The ultrasonic probe 10 is part of a liquid level monitoring system that also includes a central computer or sequential controller using a microprocessor such as an 8097, a timer, an interactive control panel, a display, and a driver and receiver assembly, depicted collectively as a monitor assembly 14. The monitor assembly 14 will be described in detail below. The ultrasonic probe 10 in FIG. 7 is electrically connected to a distribution box 16 located adjacent to a standpipe 18 that extends upwardly out of the ground from the tank 12. The distribution box 16 is connected by an underground cable 20 to the monitor assembly 14.

Figure 6:
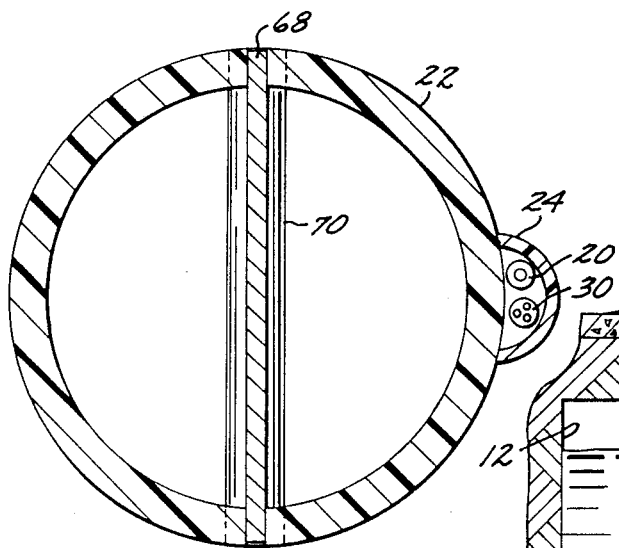
FIG. 6 is a cross-sectional view along line 6—6 of FIG. 1.

FIGS. 1 and 2 show a hollow tubular probe body 22, with the cable 20 passing down the side of the probe body 22 through a cable guideway 24 to a probe foot assembly 26 at the lower end of the body 22. The probe body 22, as shown in FIG. 6, is preferably of circular cross section. FIG. 6 also shows the cable 20 and the cable guideway 24 in section, along with a three wire cable 30 carrying power to, and signals, from a temperature sensor 32 shown at the upper left of FIG. 3.

The probe body 22 has an upper end 34 (FIG. 1) and a lower end 35 (FIG. 3). The length of the probe body must exceed the maximum depth of liquid to be measured, since the surface of the liquid must be available in the interior of the probe body, as will be discussed below.

FIG. 3 shows the probe foot assembly 26 as a cylindrical assembly attached to the lower end 35 of the probe body 22. The probe foot assembly 26 includes a cylindrical casing 39 that is preferably machined from nylon. A central axial bore 40 passes through the length of the probe foot assembly 26. The upper portion of the bore 40 has an enlarged diameter 41 to receive the outer diameter of the lower end 35 of the probe body 22.

The cylindrical casing 39 is typically locked to the probe body 22 by screws (not shown), or other suitable means, such as threaded arrangements or adhesive bonding.

FIG. 3 shows a back ranging target 44 installed in an annular recess 45 at the bottom of the bore 40. The back ranging target 44 is an upwardly convex metallic disk that is acoustically reflective to provide an echo. The foot assembly 26 has a bottom surface 46 that is adapted to be pressed against the bottom of the tank 12. The reflective surface of the back ranging target 44 is at a fixed known distance from the bottom of the tank. The back ranging target 44 is held in place by a retaining ring 47.

The probe body 22 is made from a material that has a low coefficient of thermal expansion, high thermal stability, high thermal resistance, and low acoustical conductivity. A suitable material is fiberglass.

Figure 9:
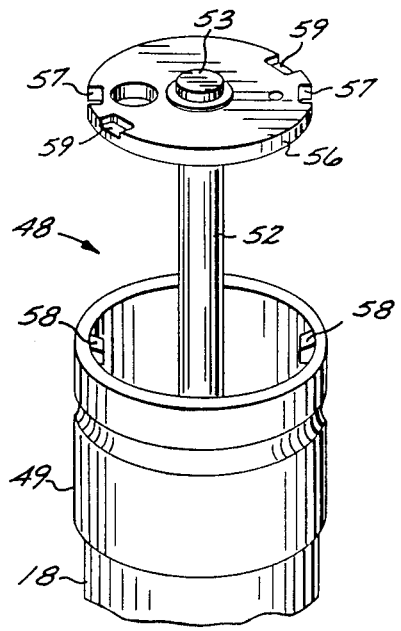
FIG. 9 is a perspective view of the locking disk on a compression rod at the upper end of the probe, with the compression rod extending from a fill adapter ring in the standpipe of an underground tank.
Figure 10:
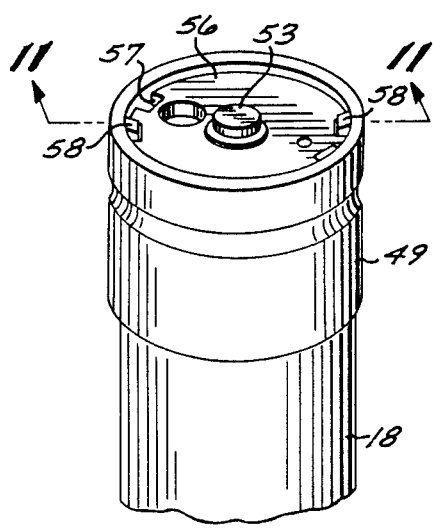
FIG. 10 a perspective view of the locking disk engaged with the fill adapter ring.
Figure 11:
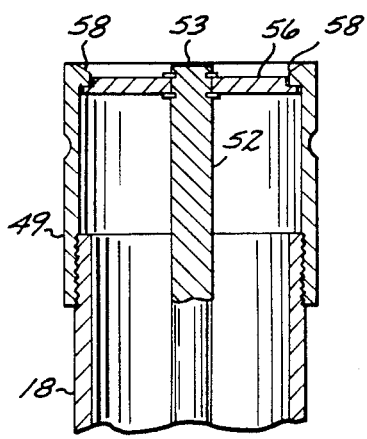
FIG. 11 is a cross-sectional view taken along line 11—11 of FIG. 10.

FIGS. 1 and 2, along with FIGS. 9 through 11, show a mounting assembly 48 for holding the probe body 22 in a substantially vertical position within the tank 12. The standpipe 18 of the tank 12 (as shown in FIGS. 7, 9, 10 and 11) is fitted with a fill adapter ring 49, as shown in FIGS. 9 and 10. The mounting assembly includes a guide bushing 50 (FIG. 1), having an outer diameter sized for a press fit into the interior of the probe body 22 through the upper end 34 thereof.

A compression rod 52, having a top end 53 and a bottom end 54, is slideably engaged in the guide bushing 50, with the bottom end of the compression rod positioned in the probe body 22 above the uppermost expected liquid level. A locking disk 56 is fixed to the top end of the compression rod 52. The locking disk 56 has a diameter selected for insertion into the interior of the fill adapter ring 49, as shown in FIGS. 10 and 11. One or more peripheral notches 57 are provided on the disk 56, at locations that register with complementary ears 58 extending radially inwardly from the interior wall of the fill adapter ring 49. Circumferentially offset from each notch 57 is a recess 59. The probe is lowered into the standpipe until the ears 58 pass through the notches 57, and then the disk 56 is rotated until the recesses 59 are placed under the ears. FIGS. 1 and 2 show an adjusting collar 62 carried on the compression rod 52 a fixed distance below the locking disk 56 and above the guide bushing 50. A coil spring 64, is carried on the compression rod 52, between the adjusting collar 62 and the guide bushing 50. The length of the spring 64, and its constant, are selected so as to place the spring 64 in compression when the ultrasonic probe 10 is passed into the standpipe 18 with the probe foot assembly 26 resting on the bottom of the tank 12, and with the locking disk 56 engaged against the ears 58, as described above. The compression of the spring 64 biases the locking disk 56 against the ears 58, thereby securing the probe in the standpipe 18 by means of the engagement of the ears in the recesses 59.

Figure 4:
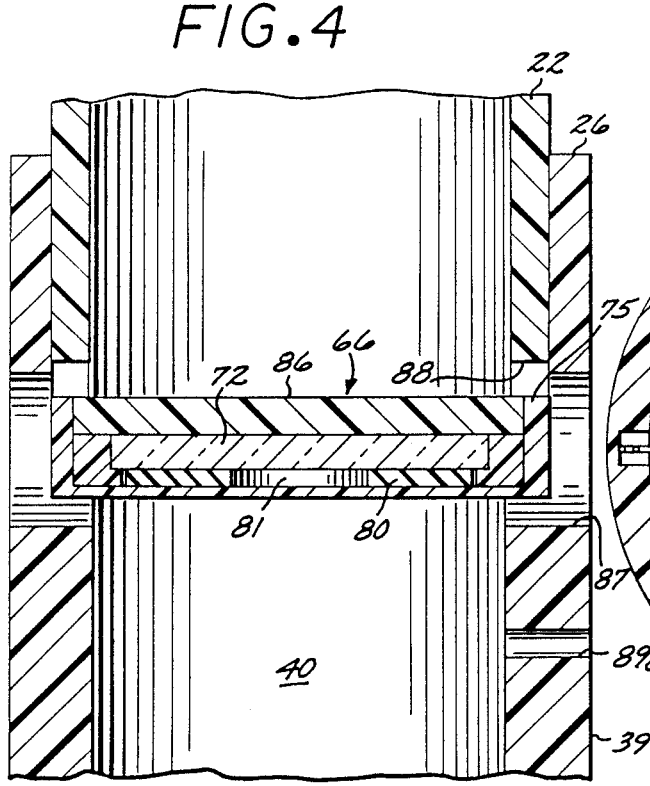
FIG. 4 is a partial sectional view, taken on line 4—4 of FIG. 3, showing the transducer assembly in greater detail.
Figure 5:
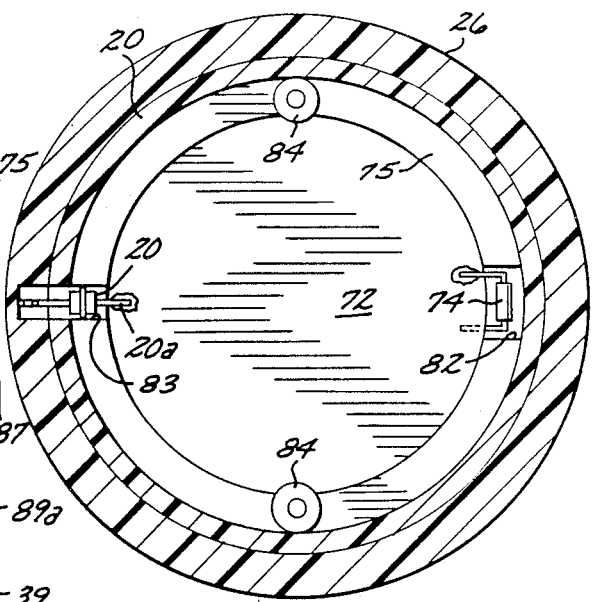
FIG. 5 is a cross-sectional view taken along line 5—5 of FIG. 3.

FIGS. 3, 4, and 5 show the transducer assembly 66 positioned within the probe foot assembly 26 at a fixed distance above the back ranging target 44. The transducer assembly 66 transmits bi-directional ultrasonic pulses along the longitudinal axis of the probe, to the surface of the liquid and to the back-ranging target 44. Echoes are reflected back to the transducer assembly both from the liquid surface and the back-ranging target, as will be described below.

FIGS. 1 and 6 show first and second calibration rods, 68 and 70 respectively. The calibration rods 68 and 70 pass through the probe body 22 between the transducer assembly 66 and the probe upper end 34. The sectional view of FIG. 6 shows the first calibration rod 68 in section, and the second calibration rod 90 in plan view. The calibration rods 68 and 70 are positioned at predetermined distances from the transducer assembly 66. The diameters of the rods increase as their distance from the transducer assembly increases. The first, or lower calibration rod 68 is preferably a brass 24 rod approximately 1.6 mm (1/16 inch) in diameter, with its bottom most point located at a distance of 27.066 cm (10.656 inches) above the transducer assembly 66. The upper calibration rod 70 is preferably a brass rod about 6.4 mm (¼ inch) in diameter, with its bottom most point located 144.463 cm (56.875 inches) above the transducer assembly 66. The second calibration rod 70 must be larger than the first calibration rod 68 to provide echoes comparable in energy content, due to the greater distance between the second calibration rod 70 and the transducer assembly 66.

The temperature sensor 32 (FIG. 3) is a tube-like assembly on the side of the probe body 22. The temperature sensor is typically an integrated circuit with a three wire interface. Two of the wires provide +5.0 Vdc and return ground. The third line is the output signal line. The output voltage on the signal line, measured with respect to the return ground, is convertible into degrees Fahrenheit directly. An output voltage of 0.0 volts signifies 0.0 degrees and an output voltage of 0.75 volts signifies 75 degrees. The output voltage range is 0.0 to 2.5 volts, or from 0 degrees to 250 degrees.

The temperature sensor is positioned near the bottom of the probe to provide an approximate indication of what the temperature of the liquid in the tank is with an accuracy of one or two degrees. The approximate change of the speed of sound in gasoline, for example, is about 30.5 cm (one foot) per second per degree fahrenheit.

A typical fuel storage tank, for use in a service station, measures approximately 8 feet (96 inches) in diameter and has a length of 21 feet. The tank is typically buried on its side, so the maximum depth measurement is typically 96 inches. The capacity is obtained by using the value of the measured depth of the fuel as an address for a memory system. A computer program uses the inputted diameter and the length of the tank to calculate a new look up table for insertion in a memory system for each two inch interval of tank depth. Each address location in the memory system contains the value of a pre-calculated capacity associated with that depth. The value of the capacity of the tank that corresponds to the value of the depth is read out for display and/or storage on a conventional digital indicator and/or storage system in monitor assembly 14.

The transducer assembly 66 contains a piezoelectric crystal that functions as an ultrasonic transducer 72 designed for operation in the 480 KHz to 600 KHz range. FIG. 5 shows the top surface of the transducer 72, which is shaped as a circular disk. The top and bottom surfaces of the transducer 72 are coated with a metal, such as silver. The metallized surfaces are dielectrically isolated by the transducer 72. A discharge resistor 74, with a preferred value of 8.2K ohms, has a first lead connected to the top surface of the transducer 72, and a second lead connected to the bottom surface of the transducer 72, to provide a discharge path for any electrostatic charge that might accumulate between the two metallized surfaces.

The transducer 72 is driven by an oscillator on a circuit card that may be located several hundred feet from the probe, in monitor assembly 14. As will be described more fully below, with reference to FIG. 16, an air core transformer having a turn ratio of 27.5 to 1, driven by a pulse amplifier powered from a +12 Vdc source, is used to step up a sinusoidal drive signal to approximately 300 volts peak. The drive signal is carried to the transducer 72 via the coaxial cable 20. As shown in FIGS. 3, 4b, 5 and 6, the coaxial cable 20 has a center lead 20a that is soldered to the top metallized surface of the transducer 72, while the cable shield 20b is finished and soldered to the bottom surface of the transducer 72.

Figure 4A:
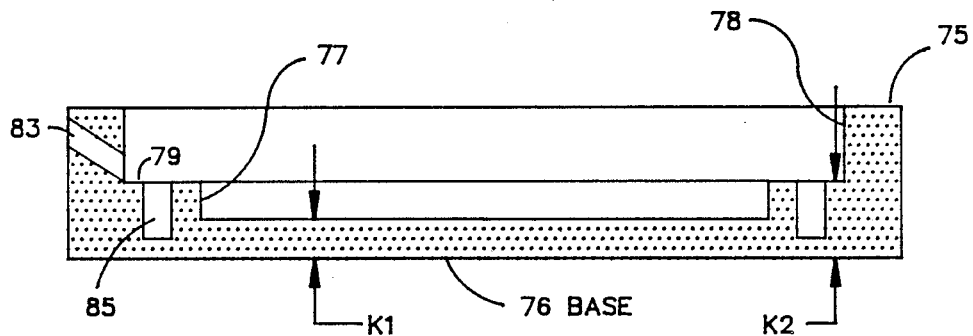
FIG. 4a is a cross-sectional view of the cup or holder for the ultrasonic transducer.

FIG. 4a shows a cylindrical cup 75 which forms the outer housing of the transducer assembly 66. The cup 75 is preferably formed from fiberglass. The fiberglass cup 75 has a flat base 76 that forms the base of the transducer assembly 66. The cup 75 has a first axial bore 77 creating a base with a thickness K1. The thickness K1 is sufficient to provide the needed structural strength, yet thin enough to allow the passage of ultrasonic pulses without significant attenuation. The cup base 76 is free of holes or seams and provides a fluid tight seal to protect the transducer 72.

The cup 75 has a second axial bore 78, with a diameter that is larger than the first bore diameter. The second axial bore 78 bottoms on a flange 79 at a height K2 above the base of the cup 75.

Figure 4B:
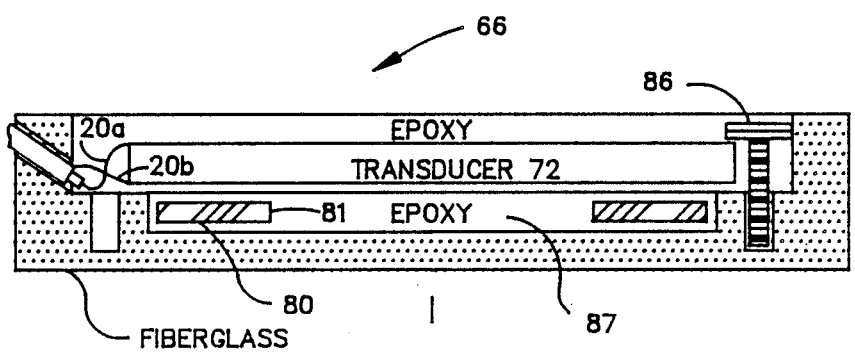
FIG. 4b is a cross-sectional view of the transducer assembly showing the transducer and sulfide rubber washer in the cup.
Figure 8:
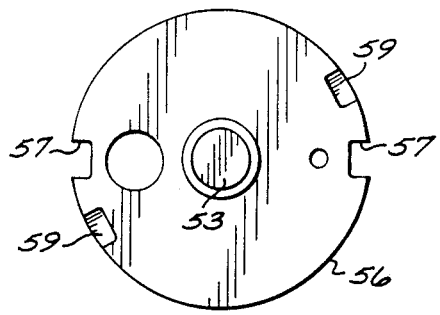
FIG. 8 is a top plan view of the probe, taken along line 8—8 of FIG. 1, showing a locking disk.

As shown in FIGS. 3, 4 and 4b, the first axial bore 77 has a diameter that is sufficient to receive the outer diameter of a sulfide rubber damping washer 80 having a central aperture 81. The transducer 72 is positioned in the second axial bore 78, on top of the damping washer 80. The central axis of transducer 72 is positioned to be coaxial with the central axis of the cup 75 and the central axis of damping washer 80.

A recess 82 is provided in the interior of the cup to receive the discharge resistor 74, as shown in FIG. 5. As shown in FIG. 4b, a small hole is drilled through the side of the cup to provide an entry 83 for the coaxial cable 20. The entry 83 passes through the cup to the inner wall of the cup at a downward angle of approximately 45 degrees to horizontal. The entrance angle is provided to reduce the stress on the cable 20 as it transitions from its track within the cable guideway 24 into the transducer assembly 6.

As shown in FIG. 5, the coaxial cable 20 and the discharge resistor 74 are connected to the transducer 72, and the transducer is clamped into the cup and held against the top surface of the sulfide rubber washer 80 by nylon rivets 84. Rivet shank-receiving holes 85 are located on the surface of the flange 79 above the base of the cup. The shank-receiving holes 85 are positioned adjacent to the perimeter of the transducer 72. Nylon rivets 86 have heads that partially engage the top surface of the transducer 72. The shanks of the rivets are pressed into shank receiving holes 85 (FIG. 4b).

Once the transducer 72 is locked down by the nylon rivets 86, the cup is filled with an encapsulant 86, preferably a clear epoxy type. The encapsulant epoxy completely encapsulates the transducer 72, the coaxial cable terminations, the discharge resistor 74 and the damping washer 80. The aperture 81 in the damping washer 80 is also filled with the epoxy encapsulant, as shown in FIG. 4b. No surface of the transducer 72 is exposed to the liquid in which the probe is immersed.

FIGS. 1 and 3 show an inlet port 88 of approximately ⅜ inches in diameter drilled through the side of the probe foot assembly 26, that provides for the entry of liquid and the escape of gases from the interior of the probe body at the bottom end 35 of the probe body 22. Slot 89 is cut into the bottom end 35 of probe body 2 for alignment with inlet port 88 as the probe foot is attached to the probe body. Entrapped gases are also vented through drain holes 90a, 90b, 90c, and 90d. Liquid is only admitted into the probe near its bottom to reduce movement of fluid in the probe and because the bottom of the tank is the region of greatest thermal stability.

FIG. 12 shows the timing relationship between several signals during the transmission of an acoustical pulse and some of the signal relationships that are required as the echo signals are received. The transducer 72 is excited by a substantially sinusoidal transmitter signal represented by the transmitted pulse 94 in waveform (i). The transmitted pulse is shown to have a peak-to-peak amplitude of approximately 600 volts that causes the transducer 72 to transmit a substantially sinusoidal, ultrasonic acoustical pulse along the longitudinal axis of the probe body 22 to the surface of the liquid. An echo returns from the surface of the liquid to the transducer 72. The transducer 72 receives the echo from the liquid surface, providing a corresponding and substantially similar sinusoidal echo signal 96. The received signal from the surface is called the main pulse and is typically in the range of 20–30 volts, peak-to- peak. The amplitude of waveform (h) is not shown to scale. The frequencies of the transmitted pulse 94 and the received pulse 96 are typically in the range of 480 Khz to 500 Khz.

Figures 16, 16A:
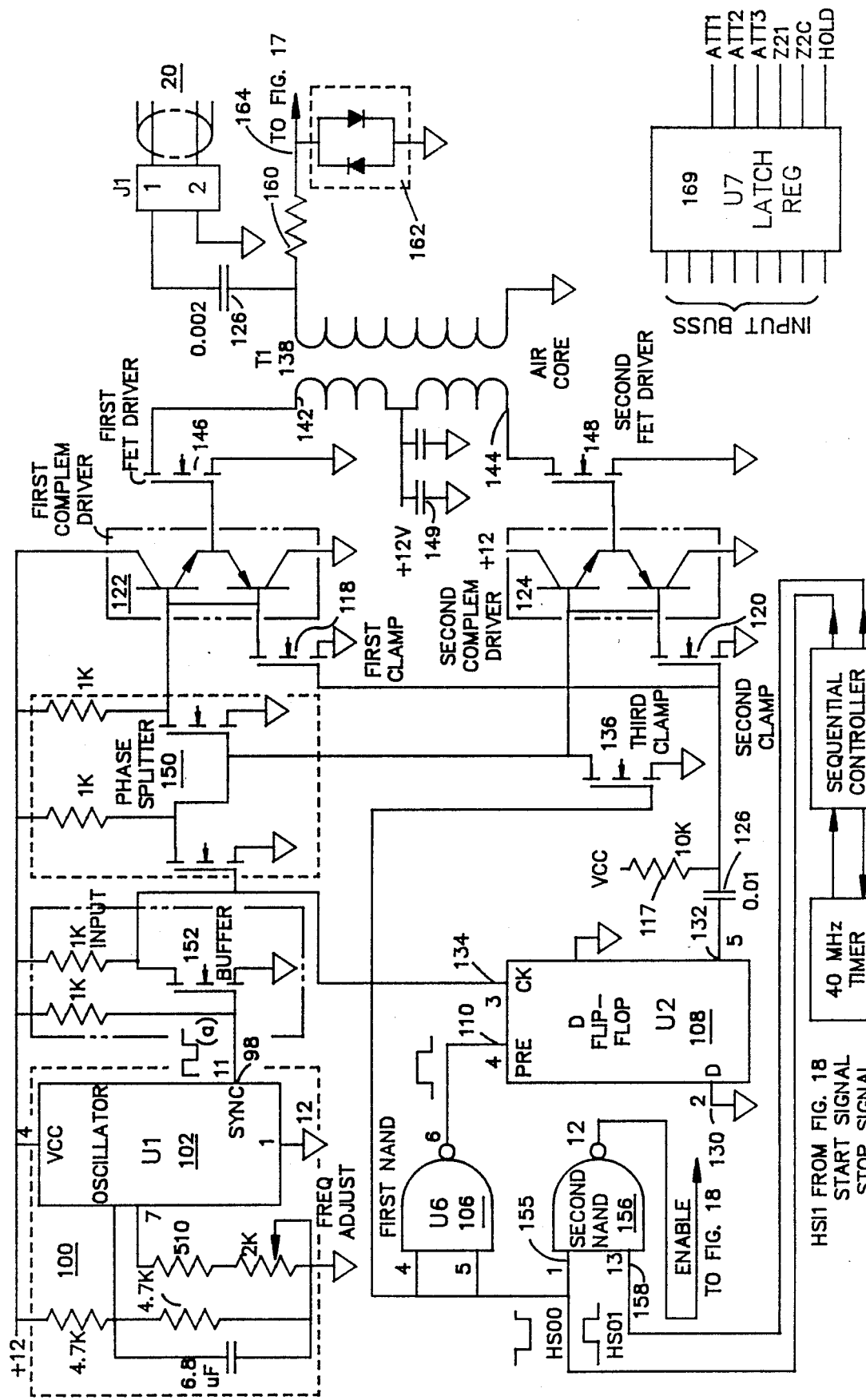
FIG. 16 is a schematic diagram of a transmitter circuit used in the invention.
FIG. 16a is a schematic diagram of a latch register.

FIG. 16 is a schematic of a circuit for developing a transmitted pulse, such as the transmitted pulse 94. The operation of the circuit of FIG. 16 will be explained with reference to the waveforms of FIG. 12. The transmitter circuit is driven by a clock signal represented by the waveform (a) from a sync output 98 of an oscillator circuit 100. The oscillator device 102 is typically an integrated circuit, such as the XR2206 by the EXAR company of San Jose, Calif. The output of the oscillator 100 is a free running square wave.

The oscillator circuit 100 has two potentiometric controls (only one of which is shown), to set two different frequencies that are slightly different from each other for dual probe operation. A logic term is fed to an FSK input at pin 9 (not shown), to select the second frequency for the second probe in a two probe system. The FSK input has a threshold at about two volts. In a typical two probe system, one frequency might be 480 KHz and the other might be 485 KHz, since the transducers are all a little different. The frequency is adjusted to operate the channel at a point of best resonance.

Referring again to FIG. 12, a pulse duration signal, such as waveform (b), is applied to an input 104 of a first NAND gate 106. This signal, designated "HS00" in FIG. 16, is supplied by a central processor or sequential controller 107 operating under a process or sequential control program, to be discussed later in connection with FIGS. 19 and 20. The pulse will be transmitted for as long as the HS00 term remains low and the RC network of resistor 117 and capacitor 126 have not timed out. Pulse durations range typically from about 2 microseconds to about 18 microseconds. The HS00 signal is inverted by the first NAND gate 106 to provide a preset signal, represented by waveform (c), to the PRE terminal 110 of a start flip-flop 108, which is typically a D flip-flop.

A resistor 117 biases first and second FET clamp transistors 118 and 120 to the "ON" state, with the output from the flip-flop 108 in the high state to prevent the clock signal from driving a pair of complementary drivers 122, 124. As the Q output of the flip-flop 108 goes from "high" to "low," the signal transition is coupled by a capacitor 126 to the gates of the transistors 118 and 120 to turn these FETs off, allowing the transmitter to copy the oscillator. The resistor 117 and the capacitor 126 are selected to provide a time constant that allows the copy interval to extend for a maximum of approximately 50 microseconds, before the voltages on the gates of the transistors 118 and 120 rise to a positive level. The clamp transistors are thus turned on again, thereby shutting off the signal to the transducer. Operation of the RC network of resistor 117 and capacitor 126 provide a fail-safe shut off for the transmitter in the event of a failure of the sequential controller 107. This circuit future helps the transmitter meet the U.L. intrinsically safe requirements by limiting the pulse duration to the transmitter.

The start flip-flop 108 is forced into a true state by the presence of a low level applied to its preset input 110. As the preset signal applied to the preset input 110 rises to a high state, the D flip-flop copies the logic level applied to its D input 130 to its Q output 132 at U2-5, in response to a positive-going clock signal at its clock input 134. The D input 130 is low, since it is grounded.

The output of the D flip-flop will change from a high state to a low state at the first occurrence of a positivegoing clock signal, as shown by waveform (d) at time t2, as it copies the low signal level at its D input to its Q output 132. The negative-going output signal from the Q output 132 of the D flip-flop 108 is coupled, via the coupling capacitor 126, to the gates of the first clamp transistor 118 and the second clamp transistor 120. Switching the gates of the first and second clamp transistors to ground drives these transistors into a nonconducting state during the interval that the Q output 132 is low.

The HS00 signal is also applied directly to the gate of a third FET clamp transistor 136. The HS00 signal, or pulse duration signal, turns the third clamp transistor 136 off while the HS00 signal is in the low state. The first, second and third clamp transistors 118, 120 and 136 allow the clock signal from the oscillator circuit 100 to be amplified to drive the transducer 72 only while they are in the non-conductive or open state. The redundant clamp circuit for turning the transmitter on and off allows the oscillator circuit 100 to free run and thus obtain its maximum stability and avoid any problems relating to oscillator start-up. The redundant clamp feature also contributes to meeting the U.L. intrinsically safe requirements.

FIG. 16 also shows the drive circuitry for the transducer 72. The transmitted pulse 96 is coupled from the secondary of an air core transformer 138, via a coupling capacitor 140, to the coaxial cable 20 that leads underground to the probe body 22. The coaxial cable can be up to about 800 feet in length. The air core transformer, discussed above, has a center-tapped primary winding driven from a +12 Vdc source. An air core transformer is preferred, since cores of ferromagnetic material, such as ferrite, were found to vary too much in their inductive properties with temperature and influenced the tuning of the circuit.

The primary coil of the transformer 138 has first and second ends 142 and 144 that are respectively driven by first and second FET driver transistors 146, 148, which are, in turn, driven by the first and second complementary transistors 122 and 124. The drive currents to the first and second driver FETS rise to 12 amps. The current demand for the transducer 72 is supported by ceramic capacitors 49. The duration of the pulse requirement is typically only about 6 to 10 microseconds, which makes capacitive storage practical.

A phase splitter 150 uses two transistors to provide complementary drive signals to the first and second complementary drivers 122 and 124. A buffer transistor 152 is driven by the clock signal of waveform (a), and provides a buffered clock signal to the clock input 134 of D flip-flop loB and to the phase splitter signal input.

The D flip-flop 108 is used to synchronize the application of the buffered clock signal to the phase splitter 150, with the turn off of the first and second clamp transistors 118 and 120, to insure that the drive power to the primary of the transformer 138 is identical for every transmitted pulse 94. The third clamp transistor 136 is turned off by operation of the HS00 signal of waveform (b) going low at time t1. The clock signal from the oscillator circuit 100 is not synchronized with the arrival of the HS00 pulse duration signal.

The start flip-flop 108 is synchronized by the first positive-going edge of the buffered clock signal, from the buffer transistor 152, being applied to its clock signal input 134 to release the transistor first and second transistor clamps 118, 120, thereby allowing the drive signal to be applied to the primary of the transformer 138 with precise synchronization for each transmitted pulse to obtain identical drive signals 94 to the transducer 72. Waveforms (g) and (h) characterize the complementary drive signals that are applied to the first and second ends, 142, 144 of the primary coil of the transformer 138.

The leading edge of the enable signal controls the start of the interval during which the receiver will respond to the next received signal that first passes through a positive polarity threshold of predetermined magnitude, as received pulse 96 is shown doing at time t5. This is done by providing a sharply defined comparator output signal, shown as waveform (j), as the received signal continues through its remaining half cycle and goes from a positive polarity value, through zero volts, to a negative polarity value, as at t6.

Waveform (j) represents the output of the receiver (to be discussed in connection with FIGS. 13, 17 and 18) as the receiver responds to the transmitted pulse to provide the start signal at t3, and to the received main pulse to provide the stop signal at t6, to start and then stop the timer gate shown schematically as wave form (k). The first negative going HSI1 signal on signal line 242 from after an enable signal goes high at t1 will be shown to characterize a start signal. A first negative going HSI1 transition after an enable signal goes high during a receive interval as at t6 will be shown to characterize a stop signal. The timer gate of waveform (k) represents the time interval between the start signal and the stop signal. A timer gate signal or the functional equivalent thereof controls a timer means such as timer 153 for measuring the time between the start signal and the stop signal and for providing a signal ,such as a digital value signal, corresponding to the time between the start signal and the stop signal, to the sequential controller.

The timer means is typically a 40 MHz precision timer 153 (FIG. 16) that is responsive to control, signals from the sequential controller 107 and to HSI for providing the digital value of the time between the start signal and the stop signal to a register in the sequential controller 107 in response to a request signal in the course of the sequential controller's execution of its program. The precision timer is not synchronized with the clock signal of waveform (a) but is running at a frequency that is approximately 82 times higher than the clock signal. Successive readings of echo times for the same depth of liquid are measured with a granularity of twenty five nanoseconds, or to within one part in 82 of the cycle time of the transmitted pulse 82.

As the low level of the HS00 signal is applied to the input of the NAND gate 106 to allow the flip-flop 108 to be synchronized with the next clock signal, the HS00 term is also applied to a first input 155 of a second NAND gate 156 to drive the enable signal from a low state to a high state at time t1. The enable signal is driven to a high state during this interval to enable the receiver to sample the transmitted signal during its first positive-going swing after it is processed through the receiver, and to provide a timer gate signal in response to the sampled transmitted signal changing from a first positive polarity to a second negative polarity signal. The timer gate signal of waveform (k) is set to a high level in response to a timer start signal represented by the first negative going transition of the receiver output signal of waveform (j) at time t3. Timing uncertainty associated with the start of the drive signal is thereby eliminated.

The signal HS01 in FIG. 16 is a receiver gate signal applied to a second input 158 of the second NAND gate 156. As either the signal HS00 or the signal HS01 goes to a low level, the ENABLE signal, of waveform (e) in FIG. 12, goes high. The receiver is able to accept and process received signals only during the interval in which the received signal is high. The sequential controller 107 (FIG. 16) or computer that controls the arrival time of HS00 and HS01 thereby controls the timing and duration of the enable signal of waveform (f). The sequential controller moves the timing and the duration of the HS01 signal to window the particular received echo signal, thereby making the receiver more selective. The first negative going transition of the receiver output signal of waveform (j) after the HS01 signal goes low, i.e. at t6, represents the timer stop signal and results in truncation of the timer gate signal of waveform (k).

As echoes return from targets, such as the liquid surface, the calibration rods 68 and 70, and the back ranging target 44, the transducer 72 converts the sound energy contained in the echo into a received signal. All received signals are transmitted via the cable 20 and sensed by an input resistor 160 (FIG. 16), and then clamped to a 1.4 volt peak-to-peak amplitude by a diode clamp circuit 162, thereby providing a clamped received signal of approximately 0.7 volts peak at an input to an attenuator network 166. received signals of less than 1.4V p-p are not clamped by the diode clamp circuit 162. The clamped received signal is coupled via signal line 164 to the input of attenuator network 166 on FIG. 17.

Figure 17:
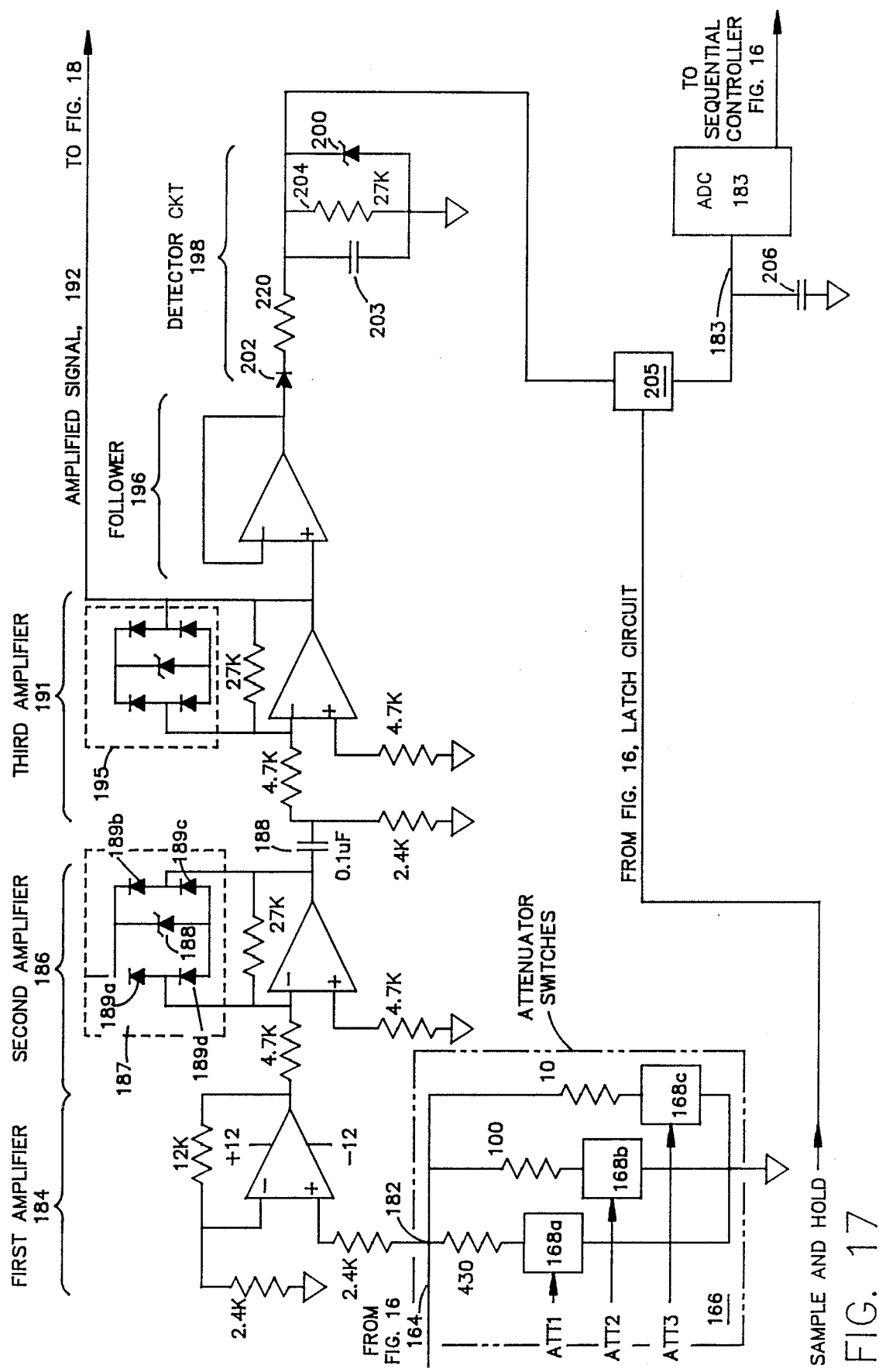
FIGS. 17 and 18 are schematic diagrams of a receiver circuit used in the invention.

The attenuator network 166, as shown schematically in FIG. 17, uses three analog switches 168a, 168b, and 168c, responsive to attenuator select signals ATT1, ATT2, and ATT3, respectively, for selecting a combination of predetermined attenuator resistors which operate in cooperation with the input resistor 160 to provide eight possible levels of attenuation to the clamped received signal. The attenuator select signals are provided from a latch circuit 169 shown in FIG. 16a. The latch circuit used is typically a 74HC373.

The latch circuit 169 is periodically addressed by the sequential controller 107 to read the state of a number of logic levels on a buss or series of discrete lines that the sequential controller 107 (FIG. 16) is able to set to predetermined states as the latch circuit is addressed. The latch circuit 169 reads the states on the respective lines and transfers the states to its outputs, such as the ATT1, ATT2, and ATT3 lines, which, in turn, control the states of the analog switches that select the required attenuator resistors.

FIG. 17 shows the analog switches 168a, 168b, and 168c responsive to attenuator select signals ATT1, ATT2, and ATT3, respectively, for coupling respective attenuator resistors 176, 178 and 180 to ground. The attenuator resistors are common at an attenuator input node 182. The first step in the receive process turns on all of the analog attenuator switches initially to attempt to identify the strongest of the signals first. The strongest return or received signal is received from the surface of the liquid being measured. This signal is referred to as the main pulse.

The back-ranging pulse from the back ranging target 44 is used to measure water level. Sound typically travels at 410 microseconds per foot in water and 480 microseconds per foot in gasoline. The transducer's front surface is 10.656 inches or 0.888 feet from the first calibration rod 68. The time of flight in gasoline is therefore 426 microseconds.

The main pulse from the liquid surface is typically received a millisecond or more after the transmitted pulse. The duration of the main pulse, that is received, is related to the length of the transmitted pulse. The amplitude of the main pulse of the received signal through antenna coupling capacitor 126 is typically as high as 60 volts. The calibration signals are in the two to three volt range. While monitoring the main pulse within the clamped received signal, the received signal is attenuated to bring the amplitude of the main pulse down to a predetermined value measured by an analog-to-digital converter (ADC) 183 within the sequential controller 107. The ADC, represented by block 181 in FIG. 17, senses an echo pulse location signal at terminal 183. To adjust the attenuator switches, the sequential controller initially closes all of the attenuator switches to introduce maximum attenuation.

If no signal is observed in the first time frame of interest, the program opens the first analog attenuator switch 168a. The first analog switch, 168a controls the first attenuator resistor 176, having a value of 430 ohm. This analog switch has the least effect on increasing or decreasing gain. The three analog switches make it possible to select eight possible levels of attenuation; however, of the eight possible, only four or five typically used. The input resistor 160 serves as the input resistor for the voltage divider formed by input resistor 160 and the eight value attenuator network 166.

A first amplifier circuit 184 (FIG. 17) is a non-inverting, ground referenced amplifier with a gain of about 5. A second amplifier circuit 186 amplifier is an inverting amplifier referenced at zero with a gain of about 6. This second amplifier 186 has a symmetrical bridge clamp circuit 187 for limiting the swing of the amplifier to prevent it from saturating, which would interfere with the bandwidth of the amplifier. The clamp circuit 187 includes a zener diode 188, which is typically a model 1N751, with a Vz test value of 5.1V. Four other bridge diodes 189a-189d are necessary with the zener diode 188 because the zener has capacitance and a slow turn-off time. These diodes 188, typically 1N914s, have a very short reverse recovery time, and prevent the zener diode 188 from turning the circuit into an integrator by reducing the effective capacitance of the bridge.

The frequency of the received signal is so high, that the amplifier can't keep up with the received signal if the zener diode 188 is used in the feedback path without the bridge diodes 189.

A decoupling capacitor 190 is place at the output of the second amplifier 186 to prevent a small dc leakage of the op-amp from contributing to the dc level changing at the input to a third amplifier 191. It is necessary to remove any dc bias at the input to the third amplifier 191, because the timing of the echo signals is based on zero crossing, and any dc level that develops contributes to an error in the time measured since it shifts the zero crossing point.

The third amplifier circuit 191 is another inverting, symmetrically clamped, op-amp stage with the same gain as that of the preceding stage. The amplified signal is coupled, via a signal line 192, to a threshold detection circuit 194, shown in a phantom block in FIG. 18. A bridge clamp circuit 195 in the third amplifier circuit 191 limits the output voltage swing to about 9V.

A follower 196 is a non-inverting follower that drives a detector circuit 198. The detector circuit 198 buffers the amplified signal and detects the envelope of the signal to form a detected signal at the cathode of a zener diode 200. A diode 202 is a half wave rectifier for the output signal from the follower 196. A capacitor 203, a resistor 204 and the zener diode 200 short out all of the ac signal components and limit the envelope to the 5.1V clamp limit of the zener diode 200.

The HOLD logic level closes a sample and hold analog switch 205 to couple the detected signal to a 1000 pF hold capacitor 206. The signal voltage on the capacitor 206 represents the echo pulse location signal at the terminal 183. The sequential controller 107 samples the signal amplitude at terminal 183 with a type 8097 ADC. The system determines where the main pulse from the liquid surface is and where it starts by sampling the voltage at the terminal 183 at various points in time. The system is programmed to sample the signal at the terminal 183 while increasing the attenuation to determine where all the signals of interest are, such as the main pulse.

This process includes the step of locating where the leading edge of the largest detected pulse is. The time of arrival of the leading edge is stored. The zero crossing of the first, second or third received signals are each close in time to the leading edge time that was stored.

Figure 18:
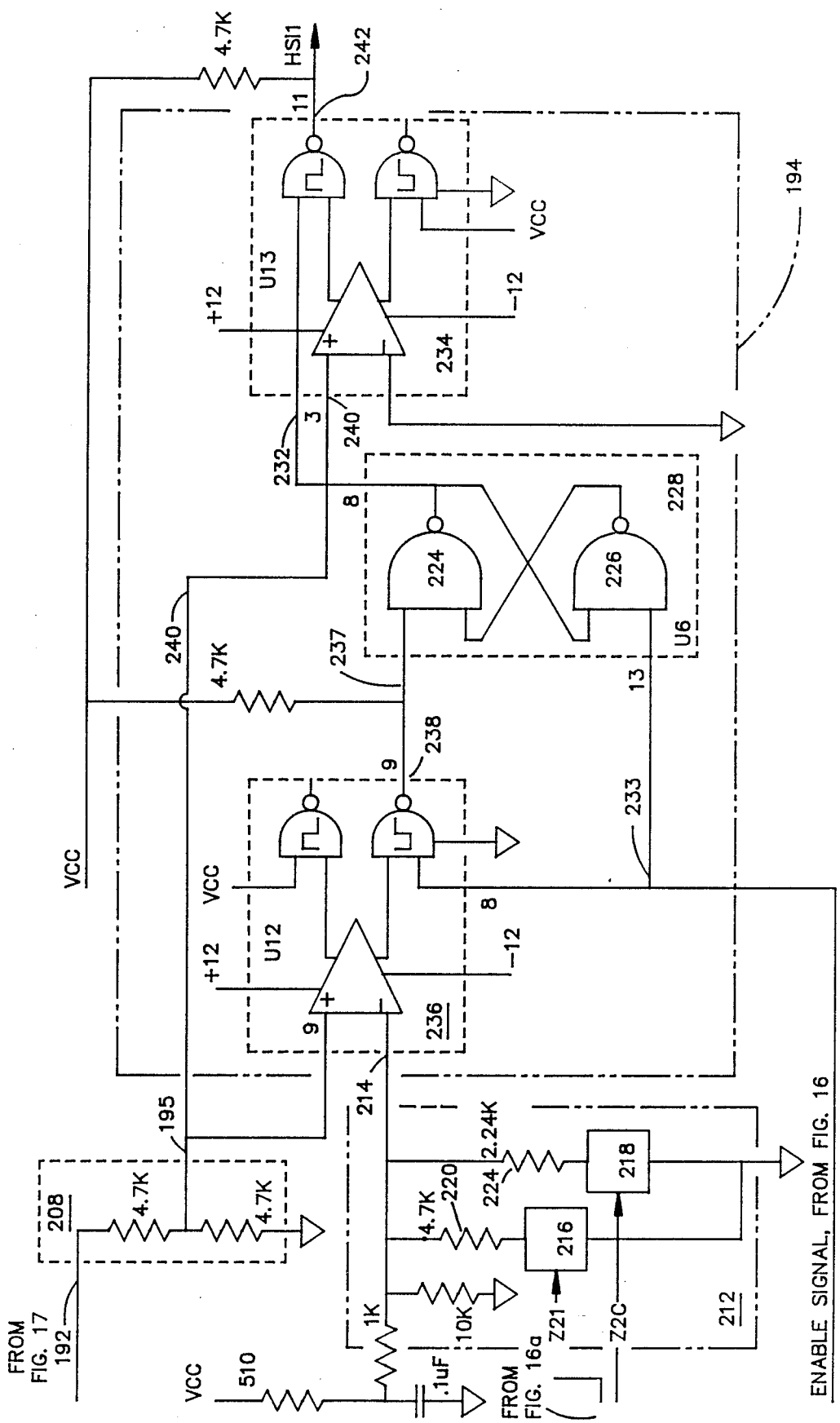

Referring to FIG. 18, the amplified signal is fed from the output of the third amplifier 191 to the input of a divider 208 to be scaled down to provide a scaled amplified signal. The scaled amplified signal is fed from the output of the divider 208 to the input of the threshold detection circuit 195.

A threshold voltage is fed from a threshold reference circuit 212 to a reference voltage input 214 of the threshold detection circuit 194. First and second threshold analog switches 216 and 218, respectively, switch first and second threshold control resistors 220 and 222, respectively, to ground under control of the sequential controller 107 in response to signals Z21 and Z2C from the latch register 169 (FIG. 16a). The logic levels on these signal lines are controlled by the sequential controller computer program as it evaluates signals and controls the level of the threshold voltage applied to the reference voltage input of the threshold detector circuit 194. The threshold voltage provided is selected by the computer. The two analog switches 216 and 218 make it possible to select up to four threshold voltage values by setting the required inputs to the latch register 169 and addressing the latch register to control the logic states of Z21 and Z2C to select the right analog switches.

Operation of the threshold detection circuit of FIG. 18 requires that the scaled amplified signal at 195 from the divider 208 rise above the level of the threshold voltage at 214 to provide a change of state at the output of the threshold detector 194.

First and second NAND gates 224 and 226, respectively, are connected to form a threshold detection latch circuit 228 that is reset by the low state at an enable signal on an enable signal line 230. FIG. 14 shows a latch circuit identical to latch circuit 214, for reference, and FIG. 15 provides a truth table defining the properties of the latch circuit 214, as well as that of FIG. 14.

While in the reset mode, the latch output signal on a latch output signal line 232 remains low, thereby preventing a second comparator (discussed below) from responding to any input. The state of the latch circuit 214 is only permitted to change when the enable signal at signal line 233 is high.

A threshold detector first comparator 236 has a non-inverting output and an inverting output, with only the inverting output connected to signal line 237 being used. First comparator 236 may use an LM361 device from the National Semiconductor Corporation. The inverting output is used. If the input signal on signal line 195 exceeds the reference voltage input on signal line 214, the output voltage on signal line 237 goes to a low level. A low level logic signal from a first comparator output terminal 238, in response to an input signal exceeding the threshold, results in changing the output state of the latch flip-flop 228 from a low state to a high state, thus enabling the second comparator 234 (also preferably an LM361 device) to respond to the scaled amplified signal to its signal input 240 at its non-inverting output 242.

The second comparator 234 has its reference input connected to ground. Since the attenuated received signal applied to the signal input (pin 3) of the second comparator 234 is more positive than the positive reference voltage input to the first comparator 236 as the second comparator is enabled by the setting of the latch circuit 228, the output of the non-inverting output of the second comparator 234 will remain high. As the voltage of the attenuated received signal from the divider 208 comes down in value and crosses zero volts, the signal at the second comparator output terminal 242 goes from a high to a low value. As the attenuated received signal continues to make zero crossings, the output of the second comparator 234 will continue to reverse its state accordingly, until the enable signal is removed.

The system moves the threshold level up or down as required to determine if the amplitude of the received signal is too small to be used for accurate zero crossing detection or if the signal selected is too large.

A key advantage contributing to the novelty of this invention is the recognition that it is not essential to locate and determine the zero crossing of the first received signal when operating in the leak rate measurement mode. Precise leak rate measurements only require that the receiver measure the time from the same rise of the transmitted pulse to the zero crossing of the same received signal swing in the amplified signal after every transmitted pulse.

Another advantage is that both the start (transmitted pulse) and the stop (returned pulse) pulses go through the same circuitry so that any change in that circuitry (receiver) caused by aging or temperature is automatically compensated for.

The invention uses consecutive time measurements to determine very small changes in fluid level determined from consecutive relative time measurements. The determination of which time measurement to use is made by making a number of time measurements with a number of threshold settings and determining which time measurements are repeatable.

The sequential controller or computer 107 uses a process of steps that include the steps of monitoring the detected signal out of the terminal 183 to determine the window of time in which it occurs. The program is augmented to introduce gain or attenuation as required to locate the main pulse. The threshold is adjusted while precisely measuring the main pulse flight time. By way of example, a two microsecond jump between consecutive readings is an indication that the threshold setting has jumped to the next swing in the received signal. The process permits the system to determine what the front edge of the received signal looks like.

The process of operating the attenuator and threshold switches is controlled via bus signals from the computer to the latch register 169 to permit opening and closing of the required analog switches during the proper intervals.

The latch circuit 228 (FIG. 18) is actuated by an attenuated received signal that is high enough in amplitude to exceed the threshold in combination with the enable signal. The latch circuit 228 opens the window for the zero crossing to follow. The attenuated received signal must cross the threshold. If it does cross the threshold, and it is known that this is the first threshold crossing, then it is known that the next swing that crosses zero voltage will mark the point in time to be used for the echo return time to be used for long term leak measurement.

Figure 13:
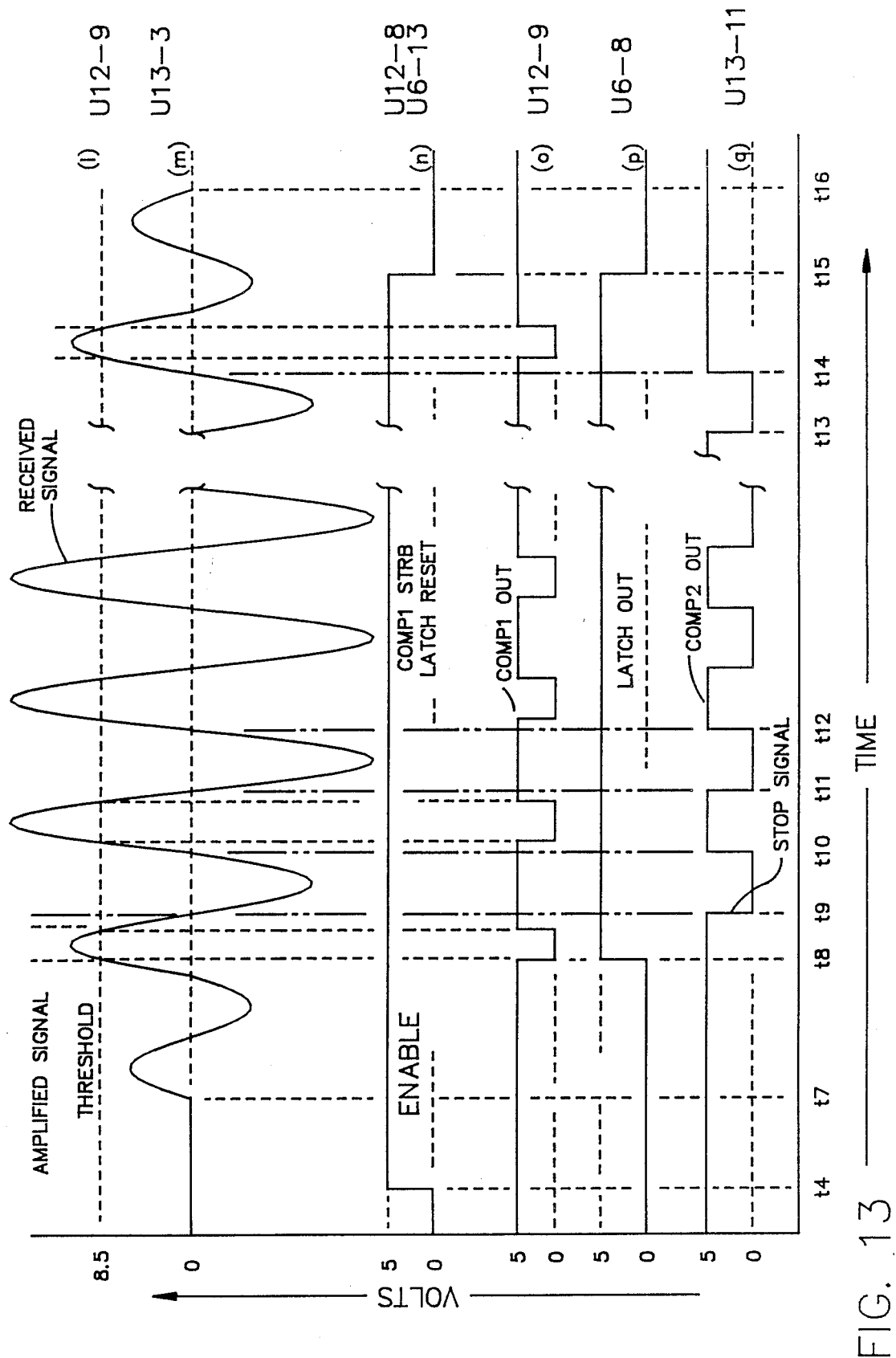
FIG. 13 is a timing diagram for detecting the received echo signal.

The first few cycles of the received signal (m) in FIG. 13 may be increasing in amplitude. It is a principal object of the system to obtain repeatable readings for the purpose of leak detection. The sequential controller 107 is programmed to identify the first, second or third swing as required to identify the first repeatably identifiable swing that crosses the threshold.

The main return pulse from the surface of the liquid is subject to more jitter, attenuation and losses for greater echo distances, i.e., when the tank is full. The main pulse flight time used in calculating capacity of the tank for a particular test is not critical.

FIG. 13 shows the timing relationship for a time interval that corresponds generally to the t4–t6 interval at the right side of FIG. 12. As previously stated, the HS01 signal from sequential controller 107 (FIG. 16) causes the enable signal from NAND gate 156 to go high, thereby enabling the receiver circuits of FIGS. 17 and 18. The enable signal of waveform (n) in FIG. 13 represents the rightmost positive interval of waveform (f) of FIG. 12.

The attenuated received signal of FIG. 13 shown as waveform (m) is observed initially to be less than the threshold level of dotted line (1) on its first cycle extending from time t7 to a time just prior to t8. The threshold (1) is shown having a value of approximately +8.5 volts. The peak of the first half cycle of the attenuated received signal is shown to peak at approximately +5.0 volts.

During the second cycle, the positive swing of the attenuated received signal penetrates the threshold level at 8.5V at time t8. The output of the first comparator on signal line 237 is shown as waveform (o). The output of the first comparator is driven low in response to the threshold penetration.

Referring to FIG. 14, and FIG. 15, the state of inputs to latch circuit 228 at time t8 is equivalent to input A being 0 and the state of the B input being 1 which results in Q1=1. Correspondingly, the state of latch circuit 228 goes high at time t8 to provide the signal of waveform (p) at the latch output signal line 232. The high logic level into second comparator 234 on latch output signal line 232 enables the second comparator to respond to the attenuated received signal on signal line 195 as the attenuated received signal (m) changes polarity at time t9.

The transition of waveform (q) from a high state to a low state at the HSI1 output of the second at time t9 represents a stop signal to the timer 153 in FIG. 16. Each subsequent transition of the attenuated received signal through zero volts, such as at times t10, t11, t12, t13 and t14 produces corresponding changes in the state of waveform (q). The sequential controller terminates the enable signal at time t15 thereby resetting the output of latch circuit 228 on signal line 232 at t15 as waveform (p) goes low. The attenuated received signal terminates at t16 as the echo ends.

The first, second and third amplifier circuits 184, 186 and 191 of FIG. 17, in cooperation with the transducer 72, the cable 20 and the coupling circuit to couple the received signal to the amplifiers, represent a means responsive to the received echo signal for amplifying the echo signal on the signal line 192.

The first comparator circuit 236 represents a first threshold detection means for providing a threshold signal corresponding to the received signal having an amplitude greater than a first reference level, such as the threshold voltage from the threshold reference circuit 212.

The second comparator circuit 234 represents a second threshold detection means responsive to a second reference signal and to the amplified received signal for providing a stop signal at the output of the second comparator that corresponds to the received signal crossing a second predetermined reference level, such as zero volts, in a predetermined direction, such as from a positive value to a negative value. A zero crossing was chosen for the second reference because, the signal is slewing fastest at that point and therefore there will be less jitter from the comparator 237.

The latch circuit 228 represents a flip-flop that is responsive to the threshold signal for providing an enable signal to the second threshold detection means, to enable the second threshold detection means, (i.e. second comparator 237), to respond to the received signal on the signal line 192 or from the divider 208, crossing a second predetermined reference level, such as zero volts, in a predetermined direction, such as from a positive value to a negative value.

Figure 19:
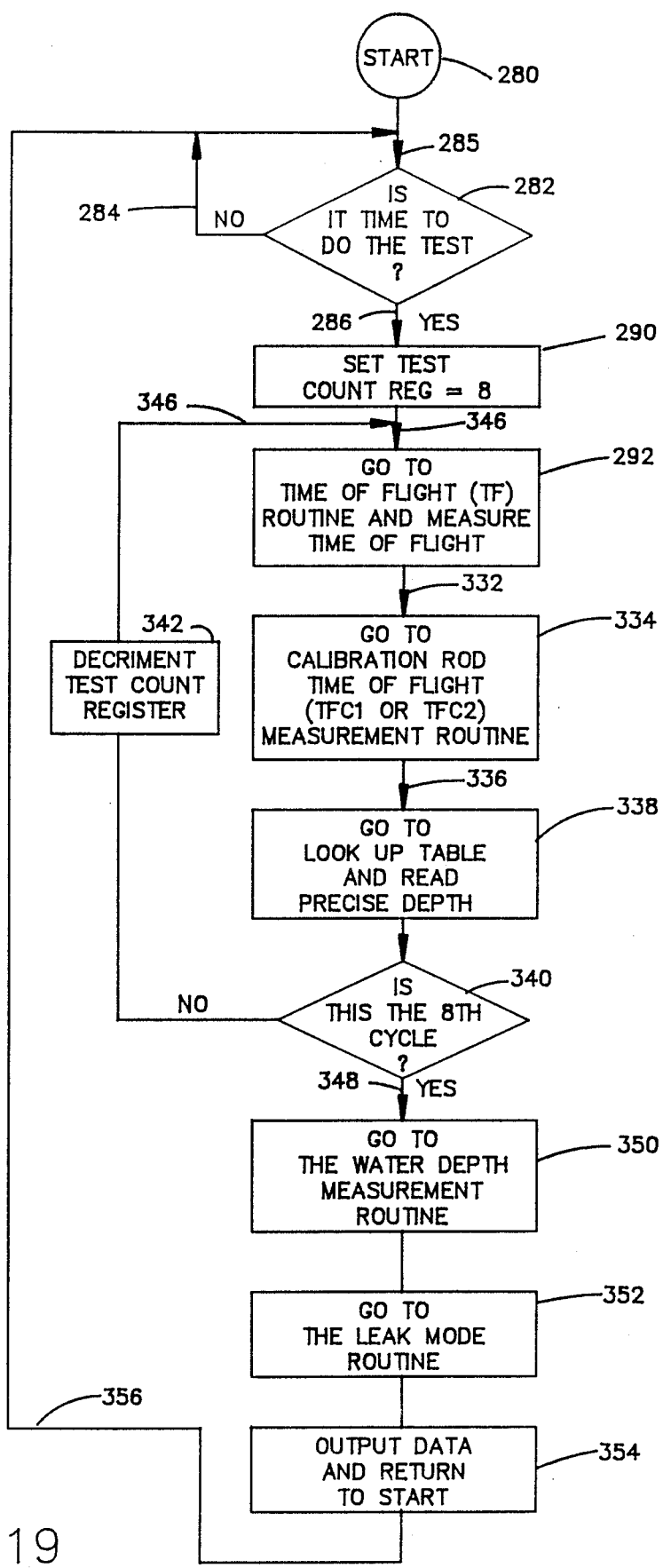
FIG. 19 is a flow diagram of the process for liquid depth measurement in accordance with the method of the present invention.

FIG. 19 is a flow chart of a program or process for the measurement of the depth of a fluid enters at a start circle 280 after power up and initialization. The program advances to a decision block 282. The liquid level measuring system is programmed to measure liquid levels during time intervals when no tank activity should be taking place; that is, when no liquid is to be added to, or removed from the tank. The decision block 282 determines if a real time clock is in a time range during which the test is to be performed. If the time is not correct, the program follows a return path 284 to an entry point 285 to test the time again.

If the time is correct, the program advances via path 286 to a SET TEST COUNT REG=8 routine, represented by a block 290, to control the number of tests that are performed. Each of the eight tests will consist of six time-of-flight measurements. Each group of six time-of-flight measurements will include at least one calibration time-of-flight measurement. A memory register or counter cell is set to a value representing the number of times the test is to be done during the testing period.

Figure 20:
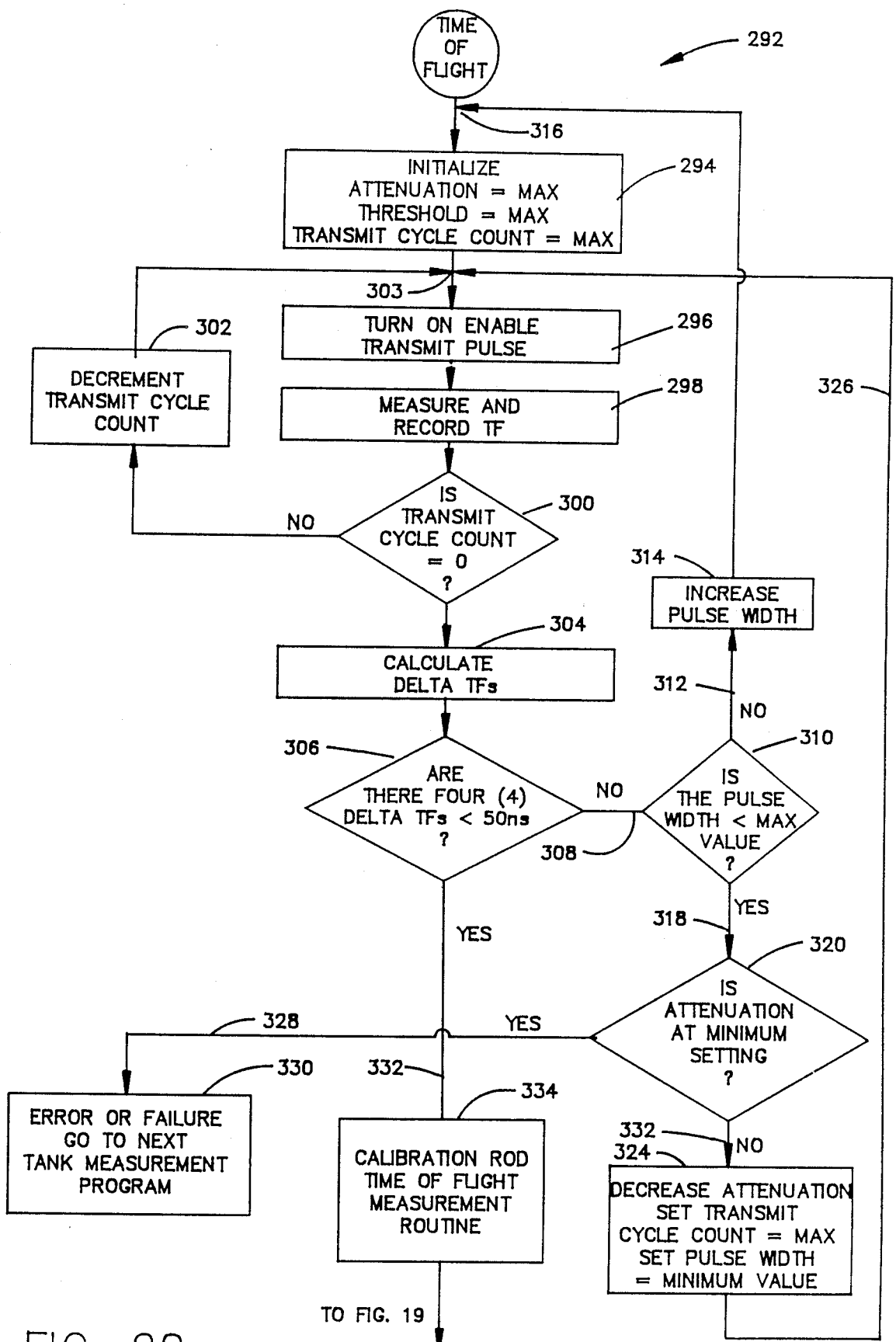
FIG. 20 is a flow diagram of the time of flight routine shown in FIG. 19.

The program advances to a TIME OF FLIGHT (TF) routine 292. A typical time of flight routine is described in greater detail with reference to FIG. 20. Referring now to FIG. 20, a block 294 represents the initialization steps that are taken to start the process of finding the main pulse from the liquid surface at the top of the probe body 22. The steps of setting ATTENUATION=MAX and THRESHOLD=MAX represent the process of addressing the latch register 169, in FIG. 16a, and setting the discrete values for ATT1, ATT2, ATT3 to their low state to turn on the first, second and third attenuator switches 170, 172 and 174 to maximize the attenuation. The discrete input values for Z21 and Z2C are set to their high state to turn off the first and second threshold switches 216 and 218, respectively, thereby maximizing the threshold voltage applied to the reference voltage input 214 in FIG. 18.

The step of setting the TRANSMIT CYCLE COUNT=MAX represents the step of setting a counter to a value equal to the desired number of measurements within a test. The cycle counter is typically set to six (6).

The program then advances to a TURN ON ENABLE, TRANSMIT PULSE block 296. The HS00 and HS01 terms are set accordingly to set the enable logic level to a 1 and to obtain a transmitted pulse. The HS00 term is controlled to obtain the desired pulse width. The initial width is typically 2 microseconds in duration. The enable signal is turned off shortly after the pulse is transmitted. Pulses are transmitted about every 0.062 seconds.

The enable pulse is turned on again at a point slightly in advance of the shortest flight time and the duration is extended to the longest flight time possible for the tank under test. The start time and the duration of the enable signal are refined by the flight time obtained from the first reading obtained to closely bracket the time expected from the liquid level. A block 298 represents the step of storing the flight time obtained.

The program then advances to a decision block 300 to determine if the TRANSMIT CYCLE COUNT equals zero, to determine if the test sequence of six pulses has been completed. If six tests have not been completed, the program is directed to a block 302 to DECREMENT TRANSMIT CYCLE COUNT and to return to the start of the flight time measurement sequence at 302 for the purpose of repeating the test to obtain another flight time value.

After completing the required number of flight time measurements, the program leaves the decision block 300 and advances to a block 304, representing the CALCULATE DELTA TFs function. Here the difference between each pair of values is calculated and stored.

The program then advances to a decision block 306, to determine if four DELTA TFs of less than 50 nanoseconds have been calculated. If the values are not grouped as required, the program advances via a path 308 to a decision block 310 to determine if the pulse width is less than a maximum value. If the answer is NO, the program advances, via a path 312, to a block 314 to increase the pulse width of the transmitted pulse by two microseconds, and then enters the program above the initialize block 294 at an entry point 316 to repeat the test sequence.

If the decision block 310 determines that the transmitted pulse width is at its maximum value, the program advances, via a path 318, to a decision block 320 to determine if the attenuation is at a minimum setting. If the attenuation is not at its minimum, the program advances, via a path 322, to a block 324, at which point the attenuation is decremented, the cycle count is again set to six, and the pulse width is again set to its minimum value. The program then advances to an entry address 302 via a path 326.

If, after reaching the decision block 320, the program determines that the attenuation is at a minimum setting, then the system has not been able to find a main pulse which indicates a fault. The program responds by then advancing via a path 328, to a block 330 and either stops or advances to the next tank measurement routine and provides an indicator signal to indicate a fault.

If after reaching the decision block 306, the program determines that it has found four or more flight times within 50 nanoseconds, the program advances via a path 332, to a block 334 to return to the main program at an entry point to the calibration rod time of flight measurement routine.

The CALIBRATION ROD TIME OF FLIGHT MEASUREMENT ROUTINE block represents a program sequence similar to the sequence of FIG. 20 with the following exceptions. The start of the enable pulse and the duration of the enable pulse are known from the position of the selected calibration rod in relation to the transducer. The routine differs also in the fact that it must provide for determining which calibration rod to use, 68 or 70 (lower or upper). Since the flight time of the main pulse is known at this point in the program, and since the time of flight for the calibration rods can be approximated, the program is able to select the appropriate calibration rod for use in the program of sequence block 334.

The threshold is kept at its maximum setting of 8.5V to blank out all noise throughout the liquid level time of flight measurement of block 292, but a different strategy is called for when measuring the time of flight to the calibration rods, since the reflected signals are lower in amplitude and more difficult to discern from noise. If no signal is obtained after reducing the attenuation, the routine for the calibration rod time of flight measurement 334 also provides for decrementing the threshold level and restarting the tests.

After selecting a calibration rod and measuring the speed of sound in the liquid by measuring the actual time of flight to the selected calibration rod, the program advances via a path 336 to a GO TO LOOK UP TABLE AND READ PRECISE DEPTH block 338. A ROM is pre-programed to provide the liquid capacity of the tank that corresponds to any time of flight that it is addressed with. The capacity of the tank is stored.

The program then advances to a decision block 340 to determine if this is the eighth cycle. If eight readings have not been made, the program advances to block 342 to decrement the test count register. The program then advances, via a path 344 to an entry point 346 for additional tests.

If the program has made eight tests, the program leaves the decision block 340 and advances, via a path 348, to a GO TO THE WATER DEPTH MEASUREMENT ROUTINE block 350. The time of flight to the back ranging target 44 is measured, using a program routine similar to the routine for measuring the calibration rod time of flight, i.e. block 334.

The time of flight to the back ranging target 44 for fuel and for water is known based on the physical distance of separation of the transducer from the target of 10 cm (3.90 inches). The depth of water within the 10 cm (3.9 inch) depth interval is determined from the relationship:

DEPTH OF WATER (cm) = (10 cm)*(product time − known time in fuel)/(speed in fuel − speed in water)

After calculating and storing the depth of water in the tank, the program advances to a GO TO LEAK MODE ROUTINE, block 352, to calculate the leak rate of the tank from the eight valid test readings that were made. The program stores the leak rate and then enters an OUTPUT DATA AND RETURN TO START routine 354 to output the required data. The program then cycles back to the initial entry point 280 via a path 356.

The advantages and novel features of the present invention should now be apparent. For example, the probe is intentionally fabricated from a tubular material of low thermal conductivity to reduce the rate at which the temperature of liquid in the tube changes. The probe tube is intentionally ported only at the bottom and vented at the top to limit motion of fluid in the tube for the same reason. During periods of no tank activity, pressure at the base of the tube remains constant because, in the absence of leaks, the mass of the liquid in the tank remains constant. The probe design provides a liquid column that enjoys significant insulation from environmental effects, that tend to influence the fluid outside of the probe, making it possible to measure the height of the column of liquid in the tank with great precision over long periods.

The computer driven sequential controller 107 initiates long series of measurements and determines leak rates of small magnitude from trend data. The data accumulated is immunized from noise or transient effects from physical disturbance or rapid temperature changes because each series of measurements is qualified. The speed of sound in the liquid is measured, and the system requires that the speed of sound remain within narrow limits for a measurement series for the data to be regarded as qualified data. In the presence of transient effects, the data taken are disqualified and not used.

In addition to the many novel mechanical features, the invention provides an ultrasonic monitoring system that presents data taken with a heretofore unattainable degree of precision in the field of tank monitoring systems. Uncertainty is removed or minimized by unique circuit features, such as the feature of insuring that each acoustic pulse is started with drive applied to the transducer in the same way. The received echo signals are not simply detected as in contemporary systems. Unique computer controlled receiver circuits are used for adapting the receiver to adjust the gain of the system to obtain repeatable echoes. A unique zero crossing circuit is introduced to monitor the point at which a particular cycle in the received echo crosses zero volts for the purpose of stopping a 40 MHz counter.

What is claimed is:

1. An ultrasonic probe for insertion into a tank for the measurement of the depth of petrochemical liquid stored in the tank, and for the detection of leaks in the tank in excess of a predetermined limit, the probe comprising:

a substantially cylindrical probe body having a top end and a bottom end, and a length in excess of the depth of liquid to be measured, the probe body having a back ranging target at the bottom end of the body, the probe body being made of a high thermal resistance material;

means for holding the probe body in a substantially vertical position within the tank, the probe body extending downward vertically through the surface of the liquid, the bottom end of the probe body being held in contact with the base of the tank;

transducer means positioned within the probe body at a first distance above the bottom end of the probe body for transmitting bi-directional pulses along the longitudinal axis to the surface of the liquid and to the bottom end of the probe body, the back ranging target being positioned to reflect a portion of the bi-directional pulses back to the transducer, and the transducer being operable to receive echoes from the back ranging target and from the surface of the liquid; and at least two calibration rods within the probe body, between the transducer and the top end of the body, each calibration rod being positioned at a successively greater predetermined distance from the transducer, and each respective calibration rod having a larger reflective surface.

2. A process for measuring the leak rate of liquid in a container by performing a plurality of qualifying liquid level measurements over a known interval of time, the liquid level measurements being convertible into liquid quantity values, the process for measuring a leak rate comprising:

positioning an ultrasonic probe into a tank containing liquid, the ultrasonic probe having a length in excess of the depth of liquid to be measured; the ultrasonic probe having a transducer coupled to the probe body at a first distance above the bottom end of the probe body;

driving the transducer with a substantially sinusoidal voltage pulse, the voltage pulse starting with the same polarity change sequence on each successive liquid level measurement;

sampling the substantially sinusoidal voltage pulse and providing a start signal corresponding to the sampled voltage pulse crossing a predetermined threshold;

receiving an echo returning from the surface of the liquid to the transducer, the transducer providing a corresponding substantially sinusoidal echo signal, and conditioning the echo signal to provide an amplified signal;

providing a stop signal corresponding to the amplified signal first crossing a predetermined reference level in a predetermined direction and then crossing a second predetermined reference level with a predetermined change in polarity; and means for measuring the time between the start and stop pulses.

3. The process for measuring the leak rate of liquid in a container of claim 2 further comprising the step of:

determining if the plurality of liquid level measurements were made during an interval in which the speed of sound in the liquid remained within predetermined limits.

4. The process for measuring the leak rate of liquid in a container of claim 2 further comprising the step of:

determining if the plurality of liquid level measurements were made during an interval in which liquid was not being added to or taken from the tank by determining that the liquid levels measured were within predetermined level limits based on a previous sequence of liquid level measurements.

5. The process for measuring the leak rate of liquid in a container of claim 2 wherein the step of providing a stop signal corresponding to the amplified signal first crossing a predetermined reference level in a predetermined direction and then crossing a second predetermined reference level with a predetermined change in polarity further comprises the steps of:

conditioning the echo signal to provide an amplified signal; and detecting a first threshold on the amplified signal to providing a first threshold detected signal corresponding to the received signal having an amplitude in excess of a first reference level; and providing the stop signal by detecting the amplified signal penetrating a second threshold as the received signal crosses a second predetermined reference level with a predetermined change in polarity sequence.

6. The process for measuring the leak rate of liquid in a container of claim 2 wherein the step of providing a stop signal corresponding to the amplified signal first crossing a first predetermined reference level in a predetermined direction and then crossing a second predetermined reference level with a predetermined change in polarity further comprises the steps of:

setting a flip-flop to a predetermined state as the amplified signal first crosses a first predetermined reference level in a predetermined direction; and using the output signal of the flip-flop to enable the detection the amplified signal crossing a second predetermined reference level with a predetermined change in polarity.

7. An ultrasonic probe for insertion into a tank for the measurement of the depth of liquid stored in the tank, the probe comprising:

a probe body in the form of a closed tube with a central longitudinal axis, a top end and a bottom end, and a length in excess of the depth of the liquid to be measured;

means for holding the probe body in a fixed reference position within the tank, the probe body extending downward vertically through the surface of the liquid, the bottom end of the probe body being held in contact with the base of the tank; and transducer means coupled to the probe body at a first distance above the bottom end of the probe body for transmitting bi-directional pulses along the longitudinal axis to the surface of the liquid and to the bottom end of the probe body, and for receiving echoes from the bottom end of the probe body and from the surface, the transducer means comprising:

an ultrasonic transducer having a top surface and a bottom surface; and a damping washer, having a hole;

the damping washer being positioned onto the bottom surface of the ultrasonic transducer, the bottom surface of the ultrasonic transducer being directed toward the bottom of the probe body through the damping washer hole, and the hole diameter being selected to provide a predetermined level of attenuation of transmitted signal energy in the downward direction; and encapsulation means for sealing the ultrasonic transducer and damping washer into a fixed parallel plane relation, the ultrasonic transducer and the damping washer being protected from liquid in the tank.

8. The ultrasonic probe of claim 7, wherein the probe body further comprises:
a closed tube having a circular cross-section;
at least a first calibration reflector within said tube at predetermined distance between the transducer and the top end of the body; and
vent hole means for flooding the probe body and for preventing the accumulation of bubbles under the transducer means.

9. The ultrasonic probe of claim 8, wherein the closed tube is formed of fiberglass tubing.

10. An ultrasonic probe for insertion into a tank for the measurement of the depth of liquid stored in the tank, and for the detection of leaks in the tank in excess of a predetermined limit, the probe comprising:
a tubular probe body with a central bore along its longitudinal axis, the probe body having a top end and a bottom end, and a length in excess of the depth of liquid to be measured, the probe body having a back ranging target at the bottom end;
means for holding the probe body in a substantially vertical position within the tank, the probe body extending downward vertically through the surface of the liquid, the bottom end of the probe being held in contact with the base of the tank;
transducer means, coupled to the probe body at a first distance above the bottom end, for transmitting bi-directional pulses along the longitudinal axis to the surface of the liquid and to the bottom end, the back ranging target being positioned to reflect a portion of the bi-directional pulses back to the transducer means, and the transducer means being operable to receive echoes from the back ranging target and from the surface of the liquid; and
a cable guideway mounted longitudinally on the outer surface of the probe body from the top end to a point above the transducer means, the cable guideway having a hollow cross section for passing a cable from the top end of the probe body to the end of the cable guideway above the transducer means, the cable passing to the transducer for connection to the transducer means.

11. An ultrasonic probe for insertion into a tank for the measurement of the depth of liquid stored in the tank, and for the detection of leaks in the tank in excess of a predetermined limit, the probe comprising:
a probe body of tubular cross section with a central bore along its longitudinal axis, the probe body having a top end and a bottom end, and a length in excess of the depth of liquid to be measured, the probe body having a back ranging target at the bottom end;
means for holding the probe body in a substantially vertical position within the tank, the probe body extending downward vertically through the surface of the liquid, the bottom end of the probe being held in contact with the base of the tank;
transducer means, coupled to the probe body at a first distance above the bottom end, for transmitting bi-directional pulses along the longitudinal axis to the surface of the liquid and to the bottom end, the back ranging target being positioned to reflect a portion of the bi-directional pulses back to the transducer means, the transducer means being operable to receive echoes from the back ranging target and from the surface of the liquid; and
a temperature measuring circuit operable to provide a signal indicative of a temperature value.

12. An ultrasonic probe for the measurement of the depth of liquid stored in an underground tank having a standpipe and for the detection of leaks in the tank in excess of a predetermined limit, the standpipe having an interior wall with an inwardly extending member, the probe comprising:
a probe body of tubular cross section sized for passage through the standpipe, the body having a central bore along its longitudinal axis, a top end, and a bottom end, and a length in excess of the depth of liquid to be measured, the probe body having a back ranging target at the bottom end of the body;
holding means for holding the probe body in a substantially vertical position within the tank, the probe body extending downward vertically through the surface of the liquid, the bottom end of the probe being held in contact with the base of the tank; and
transducer means coupled to the probe body at a first distance above the bottom end, for transmitting bi-directional pulses along the longitudinal axis to the surface of the liquid and to the bottom end of the probe, the back ranging target being positioned to reflect a portion of the bi-directional pulses back to the transducer, and the transducer being operable to receive echoes from the back ranging target and from the surface of the liquid;
wherein the holding means comprises:
a guide bushing having an inner bore and an outer diameter sized for installation into the probe body bore near the top end of the probe body;
a compression rod having top end and a bottom end, the compression rod being slideably engaged in the guide bushing bore, with the bottom end of the compression rod being disposed in the probe body bore above the liquid level;
a clamp disk coupled to the top end of the compression rod, the clamp disk having a diameter selected for insertion into the interior of the standpipe, the clamp disk having at least one notch for complementary receipt and rotary engagement under the inwardly extending member on the standpipe interior wall;
an adjusting collar positioned and locked onto the compression rod at a position between the compression rod top end and the top of the guide bushing; and
a coil spring positioned coaxially on the compression rod between the top of the guide bushing and the bottom of the adjusting collar, the spring length and spring constant being selected to place the spring in compression when the probe body is passed into the standpipe with its bottom end resting on the bottom of the tank and with the clamp disk in the standpipe bore engaged against the inwardly-extending member.

13. An ultrasonic probe for insertion into a tank for the measurement of the depth of liquid stored in the tank, the probe comprising:
probe body in the form of a closed tube of substantially uniform cross-section, having an elongated shape with a central longitudinal axis, the probe body having a top end and a bottom end at opposing ends of the body, and a length in excess of the depth of the liquid to be measured;

means for holding the probe body in a fixed reference position within the tank, the probe body extending downward vertically through the surface of the liquid, the bottom end of the probe body being held in contact with the base of the tank;

transducer means coupled to the probe body at a first distance above the bottom of the probe body for transmitting bi-directional pulses along the longitudinal axis to the surface of the liquid and to the bottom end of the probe body, and for receiving echoes from the bottom end of the probe body and from the surface; and at least a first calibration reflector within the probe body at a second predetermined distance along the longitudinal axis from the transducer.

14. The ultrasonic probe of claim 13, wherein the probe body further comprises a back-ranging target at the bottom end of the body, the back-ranging target being positioned to reflect a portion of the bi-directional pulses back to the transducer.

15. The ultrasonic probe of claim 13, wherein the probe body further comprises:

at least two calibration reflectors within said tube between the transducer means and the top end of the body, each calibration reflector being positioned at a successively greater predetermined distance from the transducer means, each respective reflector having a larger reflective surface.

16. The ultrasonic probe of claim 15, wherein each calibration reflector is a rod passing through the probe body transverse to the longitudinal axis.

17. An ultrasonic probe for insertion into a tank for the measurement of the depth of a petrochemical liquid stored in the tank, and for the detection of leaks in the tank in excess of a predetermined limit, the probe comprising:

a probe body of substantially tubular cross-section with a central bore along a longitudinal axis extending between a top end and a bottom end, the length of the probe being greater than the depth of the liquid to be measured;

a back-ranging target at the bottom end of the probe body;

means for holding the probe body in a substantially vertical position within the tank, the probe body thereby extending downwardly through the surface of the liquid, with the bottom end of the probe body being held in contact with the base of the tank;

transducer means coupled to the probe body at a first distance above the bottom end, for transmitting bi-directional pulses along the longitudinal axis to the surface of the liquid and to the bottom end of the probe body, the back-ranging target being positioned to reflect a portion of the pulses back to the transducer means, the transducer means thereby receiving echoes from the back-ranging target and from the surface of the liquid; and a calibration rod passing through the probe body transverse to the longitudinal axis, and positioned at a predetermined distance between the top end of the probe body and the transducer means.

* * * * *